(12) United States Patent
Kravis et al.

(10) Patent No.: US 7,965,816 B2
(45) Date of Patent: Jun. 21, 2011

(54) SCANNING X-RAY INSPECTION SYSTEM USING SCINTILLATION DETECTION WITH SIMULTANEOUS COUNTING AND INTEGRATING MODES

(75) Inventors: Scott D. Kravis, West Caldwell, NJ (US); Karl E. Geisel, Ringwood, NJ (US); Karl Voigtland, Hoboken, NJ (US); Arthur W. Mario, Hopatcong, NJ (US)

(73) Assignee: Control Screening, LLC., Fairfield, NJ (US)

( * ) Notice: Subject to any disclaimer, the term of this patent is extended or adjusted under 35 U.S.C. 154(b) by 144 days.

(21) Appl. No.: 12/462,808

(22) Filed: Aug. 10, 2009

(65) Prior Publication Data

US 2010/0034353 A1    Feb. 11, 2010

Related U.S. Application Data

(60) Provisional application No. 61/188,575, filed on Aug. 11, 2008, provisional application No. 61/192,115, filed on Sep. 15, 2008.

(51) Int. Cl.
*G01N 23/201* (2006.01)

(52) U.S. Cl. ............................................. 378/87; 378/57
(58) Field of Classification Search .................... 378/57, 378/62, 86–90; 250/370.08, 370.09, 370.11
See application file for complete search history.

(56) References Cited

U.S. PATENT DOCUMENTS

| | | | |
|---|---|---|---|
| RE28,544 E | 9/1975 | Stein et al. | 378/146 |
| 5,260,982 A | 11/1993 | Fujii et al. | 378/87 |
| 5,313,511 A | 5/1994 | Annis et al. | 378/87 |
| 6,661,867 B2 | 12/2003 | Mario et al. | 378/57 |
| 7,072,440 B2 | 7/2006 | Mario et al. | 378/57 |

*Primary Examiner* — Courtney Thomas
(74) *Attorney, Agent, or Firm* — Ernest D. Buff; Ernest D. Buff & Associates, LLC; Gordon E. Fish

(57) ABSTRACT

X-ray radiation is transmitted through and scattered from an object under inspection to detect weapons, narcotics, explosives or other contraband. Relatively fast scintillators are employed for faster X-ray detection efficiency and significantly improved image resolution. Scatter and transmission images of the object are displayed, at least one being colorized in accordance with the effective atomic number of constituents of the object. Soft switching between photon-counting and photon integration modes reduces noise and significantly increases overall image quality.

32 Claims, 23 Drawing Sheets

Fig. 17

```
for (iVer = 1; iVer < imageVer-1; iVer++)
{
    for (iHor = 1; iHor < imageHor-1; iHor++)
    {
        cc=-dataIn[iVer-1][iHor-1] -1*dataIn[iVer-1][iHor] -dataIn[iVer-1][iHor+1];
        cc+=dataIn[iVer+1][iHor-1] +1*dataIn[iVer+1][iHor] +dataIn[iVer+1][iHor+1];
        c=abs(cc);
        cc=-dataIn[iVer-1][iHor-1] -1*dataIn[iVer][iHor-1] -dataIn[iVer+1][iHor-1];
        cc+=dataIn[iVer-1][iHor+1] +1*dataIn[iVer][iHor+1] +dataIn[iVer+1][iHor+1];
        c+=abs(cc);
        dataOut[iVer][iHor]=c*256*exp (-imageAvg[iVer][iHor]/1023)/imageAvg[iVer][iHor];
    }
}
```

SCANNING X-RAY INSPECTION SYSTEM USING SCINTILLATION DETECTION WITH SIMULTANEOUS COUNTING AND INTEGRATING MODES

RELATED U.S. APPLICATION DATA

This application claims the benefit of U.S. Provisional Application Ser. No. 61/188,575, filed Aug. 11, 2008, and entitled "Scanning X-Ray Inspection System Using Scintillation Detection With Simultaneous Counting And Integrating Mode," and U.S. Provisional Application Ser. No. 61/192,115, filed Sep. 15, 2008, and entitled "Scanning X-Ray Inspection System Using Scintillation Detection With Simultaneous Counting And Integrating Mode," which are both incorporated herein in the entirety by reference thereto.

BACKGROUND OF THE INVENTION

1. Field of the Invention

The present invention relates to X-ray screening systems for airport luggage, cargo, parcels, inter-modal containers, and the like; and, more particularly to screening systems that utilize radiation transmitted through and scattered from an object under inspection to detect weapons, narcotics, explosives or other contraband.

2. Description of the Prior Art

X-ray inspection systems that use transmitted radiation have conventionally been employed to detect the presence and shape of high-Z material (Z refers to atomic number) such as steel. The principal objective of these systems is the detection of weapons, such as guns, knives, bombs and the like. Although transmission systems can be used to detect items with lower Z, in practice they are often considered to be less effective for such items. One approach is provided by dual energy transmission X-ray systems, which have been used to improve the detection of low-Z material. Such systems measure the different attenuation that high and low energy transmitted X-rays inherently experience as a result of passage through a material having some effective atomic number ($Z_{eff}$). This principle has allowed the identification of virtually any material, so long as the material is not covered by a material with a different Z. In order to overcome the material overlaying problem, it has been proposed that X-ray transmission be effected from different directions using two or more X-ray sources, or that the object be scanned from all sides and the results be evaluated with computed tomography.

Another approach for identifying low-Z material involves detecting both Compton scattered radiation and transmitted radiation. Low-Z materials such as explosives, narcotics, and other organics generate comparatively more scattered radiation than high-Z material like iron. This scattered radiation differential provides a basis for distinguishing between low-Z and high-Z material in instances where the low-Z material is concealed behind high-Z material. Systems may beneficially detect forward or backward scattered Compton radiation or both. Known systems that combine detection of transmitted and Compton scattered radiation include those disclosed by U.S. Pat. No. RE 28,544 to Stein et al., U.S. Pat. No. 5,313,511 to Annis et al., U.S. Pat. No. 6,661,867 to Mario et al., and U.S. Pat. No. 7,072,440 to Mario et al. All of these patents are incorporated herein in the entirety by reference thereto.

Two physical processes principally govern the atomic-level interaction between X-rays and material objects on which common parcel scanning systems are based, namely photoelectric absorption (sometimes termed photo absorption) and Compton scattering. Depending on the radiological characteristics of the objects in a parcel and the energy of the incident X-ray beam, different fractions of the X-ray photons either pass through the parcel object without any interaction, or interact via photoelectric absorption or Compton scattering. In the former, an incident photon is fully absorbed, with transfer of all its energy to an atomic electron. On the other hand, Compton scattering causes the incoming photon to lose some fraction of its energy and to be re-emitted, or scattered, in a direction away from the incident direction, generally defined by an angle $\theta$ measured from the incident direction ($\theta=0°$). By convention, Compton scattering for which $0°<\theta<90°$ is termed forward scattering, whereas backward scattering is characterized by values of $90°<\theta<180°$. Radiation at $\theta \cong 90°$ is called side scattering.

Among the more troublesome problems with systems that use both X-ray transmission and Compton scatter to create images are poor resolution and high noise content. Some of the causes of these problems can be traced to: a) the relatively poor light collection methods used in converting X-ray photons to light photons; and b) photon integration. Detectors using relatively slow phosphors oftentimes create undesirably blurred images owing to the slow response time of the excited phosphor. Although photon integration used in conventional signal generation and processing affords advantages at high X-ray rates, it can result in noisy images, particularly in cases where the transmitted or scattered X-ray rates are relatively small. For example, U.S. Pat. No. 5,260,982 to Fujii et al. discloses a scattered radiation imaging apparatus. The Fujii et al. apparatus employs long persistence phosphor type X-ray detectors and photon integration, resulting in relatively low resolution.

A further difficulty arises from the wide dynamic range of X-ray intensity that practical scanning systems must accommodate. The impact of this wide range is especially challenging as a scanned object comprising portions with very different radiological character (i.e., photoelectric absorption and Compton scattering behavior) passes through the inspection zone. For example, a parcel might contain a metal weapon and an explosive device comprising organic explosive material and a detonator connected to electronic circuitry. These contraband objects are composed of materials having very different average atomic number and density, and thus very different radiological properties. As the different portions pass through the X-ray beam, the X-ray flux at the transmission and scatter detectors changes very rapidly. In the transmission channel, a high flux impinges on the detector when nothing is present in the inspection zone, but that intensity can drop by several orders of magnitude as a radiologically dense item, such as a massive metallic object, passes into the zone. Similar effects are seen in backscattering. Ideally, a practical detection system would accommodate these rapid changes in both channels and be capable of accurately determining the full range of X-ray intensities to give reliable imaging.

Thus, there remains a need in the art for a system and a method of X-ray inspection that would afford more rapid scanning and improved image quality, including higher resolution, reduced noise, and sharper definition of the image. Such improvements would permit items of interest, such as bombs, firearms and other weapons, currency, narcotics, incendiary materials, agents that pose biological, chemical, or radiological danger to people or property, and other contraband shapes and accompaniments to be recognized. Better systems are highly sought, especially in the context of customs and airport screening, but would be equally valuable for courthouses, stadiums, schools, government offices, nuclear power plants, military installations, correctional institutions, border control, and other public venues that might be targets of terrorist or similar criminal activity, and for inspection of cargo being shipped by any mode of conveyance.

SUMMARY OF THE INVENTION

The present invention provides in various aspects a system and method for X-ray inspection of an object to detect weapons, narcotics, explosives or other contraband.

In an embodiment, the present system includes: (i) an X-ray generation device for generating a flying-spot pencil beam of X-rays that repetitively sweeps along a straight line in a scanning direction across the object; (ii) transport means for moving the object through an inspection zone of the system in a transport direction substantially perpendicular the scanning direction; (iii) a scatter detector for generating a scatter signal represented by a scatter signal array comprising scatter pixels, each representative of the intensity of X-rays scattered from a particular region of the object; (iv) a transmission detector for generating a transmission signal represented by a transmission signal array comprising transmission pixels, each corresponding to one of the scatter pixels and representative of the intensity of X-rays in the pencil beam transmitted through the particular region of the object and undeviated in direction; (v) a read-write memory for storing the scatter signal and transmission signal arrays; (vi) a processor for processing the scatter and transmission signal arrays to associate with each pixel a value of effective atomic number $Z_{eff}$; and (vii) a display for displaying a scatter image comprising scatter display pixels corresponding to the scatter pixels and a transmission image comprising transmission display pixels corresponding to the transmission pixels. At least one of the scatter image and the transmission image is colorized, each pixel of the colorized image being displayed in accordance with a color descriptor derived from the $Z_{eff}$ value corresponding to the pixel. The $Z_{eff}$ value is determined in accordance with a preselected mapping that uniquely specifies a $Z_{eff}$ value for each possible combination of the scatter pixel intensity and the transmission pixel intensity. Alternatively, $Z_{eff}$ may be determined from the transmission channel using a preselected mapping that uniquely specifies a $Z_{eff}$ value for each possible combination of the transmission intensity determined by photon counting and by integrating counting. The scatter detector may be either a forward scatter detector or a backscatter detector. Optionally, both forward and backscattering detectors may be used, in which case the $Z_{eff}$ mapping may be based on a combination of transmission, forward, and backscatter intensities.

Further provided is a method for X-ray inspection of an object using transmitted and Compton scattered radiation. The method comprises the steps of: (i) generating a pencil beam of X-rays that oscillates repetitively along a straight line in a scanning direction within an inspection zone; (ii) transporting the object through the inspection zone in a transport direction substantially perpendicular the scanning direction; (iii) scanning the object with the pencil beam of X-rays; (iv) detecting X-rays scattered from the object using a scatter detector and storing a scatter signal array comprising scatter pixels, each representative of the intensity of X-rays scattered from a particular region of the object; (v) detecting X-ray transmission through the object using a transmission detector and storing a transmission signal array comprising transmission pixels, each corresponding to one of the scatter pixels and representative of the intensity of X-rays in the pencil beam transmitted through the particular region of the object and undeviated in direction; (vi) processing the scatter and transmission signal arrays to associate with each the pixel a value of effective atomic number $Z_{eff}$; and (vii) displaying a scatter image comprising scatter display pixels corresponding to the scatter pixels and a transmission image comprising transmission display pixels corresponding to the transmission pixels. At least one of the scatter image and transmission images is colorized. Each pixel of the colorized image is displayed in accordance with a color descriptor derived from the $Z_{eff}$ value corresponding to the pixel. The $Z_{eff}$ value may be determined in accordance with a preselected mapping that uniquely specifies the $Z_{eff}$ value for values of the scatter pixel and the transmission pixel.

The inspection systems of the invention generally employ a source to produce a pencil beam of X-rays that is scanned repetitively, or oscillated, across the inspection object. The X-rays are detected using suitable detectors, preferably scintillation detectors that employ a scintillator material optically coupled to a photomultiplier tube (PMT) or other suitable detector for lower energy electromagnetic radiation. The scintillator absorbs an X-ray photon and in response generates lower-energy photons near or within the visible part of the electromagnetic spectrum. These photons are collectively regarded as visible light photons. The scintillator is configured so that as many of these visible light photons as possible are constrained by total internal reflection to remain in the scintillator and pass into a photon detector coupled to it. The PMT effectively converts the visible-light photons to electrons, thereby generating electronic signals that can be suitably processed for image generation.

The systems may employ scintillation detectors for both transmitted and scatter radiation channels. In general, the maximum X-ray signal encountered in the scatter channel is much less intense than that in the transmission channel. That is to say, even strongly scattering materials only scatter a fraction of the X-ray flux incident on them. On the other hand, the transmission channel receives essentially the entire flux in the incident beam when there is either no object present or only a minimal amount of attenuating material. Therefore, either forward or backscatter signals are frequently processed in a photon counting mode, in which individual X-rays are counted to generate the Compton backscatter image.

For the transmitted beam image, the number of X-ray photons that enter the scintillator can vary over a wide dynamic range that is dependent on the object under inspection. In the case where there is no object or a very weakly absorbing object in the beam path, the X-ray rate on the scintillator can be so high that counting individual X-rays is not possible. At the other extreme, for a highly attenuating object the X-ray rate would be very low or even zero. To accommodate this wide range of X-ray rates, the transmission detector system in the present apparatus may operate in a combined mode, in which both photon counting and photon integrating modes are used simultaneously, such as with a method of soft-switching, also termed blending of modes. Alternatively, the mode is dynamically selected depending on the X-ray rate. These optimized methods of collecting X-ray signals yield a superior image, as opposed to using only photon counting or photon integration.

The objects being scanned are preferably transported through an inspection tunnel using a transport means. The systems of the invention typically employ a conveyor belt system. However, other alternatives such as roller beds or other manipulation systems are also possible. Larger objects to be scanned, such as intermodal containers, might also be borne on a vehicle, trailer, moving platform, or the like. X-rays are generated by an X-ray source (typically an X-ray tube). By suitable collimation, the beam is formed as a pencil beam and is generally upwardly directed from beneath the object. By a pencil beam is meant a beam having a small cross-section in a plane perpendicular to the beam propagation direction. Typically, the incident beam cross-section used herein is approximately a circle or a square with dimensions of approximately 1-10 mm, although other sizes may be dictated by the nature of the object being examined. The tunnel affords mechanical protection of the scanned objects and the system's components. It also provides shielding, both to reduce outgoing leakage of radiation and to block incoming radiation from external sources. The X-ray beam is scanned repetitively across the width direction of the conveyor belt at a fixed point along the belt system, thus providing spatial resolution in the horizontal plane as the object advances through the inspection tunnel. As only one line through the object is excited by the pencil beam at any time, the radiation captured by any scintillation detector is independent from the locus of the scintillation material that is actually hit by an X-ray photon, and must originate from this pencil line. The location of the pencil beam within the object image can be derived from the conveyor moving the object and the rotating disk with apertures that generate the pencil beam.

It is possible to generate a direct luminescent image of an object with the transmission detector and an enhanced low Z image from the backscatter detectors and display them separately. Preferably, signals obtained from the backscatter and transmission channels are combined in a non-linear fashion, permitting an effective atomic number ($Z_{eff}$) characteristic to be inferred for each path taken by the X-ray beam through the material being scanned. The $Z_{eff}$ characteristic of the object being scanned can also be inferred from only the transmission count and integration data or in combination with the backscatter data.

Preferably, images produced by the transmission detector and backscatter detector are displayed as adjacent windows of a display means, which may comprise one or more monitors of the type used in conjunction with a computer. These devices include CRTs, LCD display panels, plasma display panels, or other known display monitors. It is preferred that all the images be displayed as windows on a single monitor, so that related images are in close proximity to facilitate operator comparisons between them. In addition, a single monitor reduces the amount of an operator's field of vision that is obscured, reducing the likelihood that an operator would miss seeing a person intent on criminal behavior.

The images of the present system may also be captured and stored in any form of permanent, temporary, photographic, or recordable medium or electronic memory, and from which they may be recalled later for display and review. The images may also be printed either contemporaneously with signal acquisition or at a later time. The system is optionally interfaced with any form of computer network, so that electronically-represented images may be uploaded and stored or transferred to another location. Signal information from the transmission detector may be used to correct for attenuation effects in the backscatter images, thereby avoiding artifacts in the low Z images produced by attenuation due to high Z objects. Conversely, signal information from the backscatter detectors can be used to correct for scatter effects in the transmission image, thereby avoiding artifacts in the high Z image produced by scattering attenuation due to low Z objects. By means of these corrections a greater fraction of the image on the high Z window display is derived from absorption effects of high Z objects, and a greater fraction of the image on the low Z window display is derived from scattering effects of low Z objects. Accordingly, the images displayed by the high Z and low Z windows are more distinct. Other methods are possible to make corrections and enhancements such as combining the transmission and/or backscatter pixel values with pixel $Z_{eff}$ values generated by the different methods mentioned below.

Tomographic information can optionally be obtained by using additional Compton backscatter detectors. Backscattered X-rays originating from elements of the object closest the X-ray source hit mainly the scintillator next to the entrance slit, while backscatter from elements further up the pencil beam hit all backscatter scintillation detectors nearly equally. Photon collection efficiency is improved and real-time image noise is reduced, when compared to collimation methods that limit angular admittance of photons. The tomographic zones can be displayed in windowed sections on a single monitor or on separate monitors.

In some embodiments of the invention, a dual energy transmission detection system is optionally used to infer information such as $Z_{eff}$. For example, at least one additional detector overlaying the extant transmission detector may be used. Alternatively, the output of the transmission detector can be analyzed, e.g. by pulse height analysis, to divide the detected transmission signal into components reflecting two or more different energy ranges. This information can be displayed as a dual energy image, which is color coded to designate the atomic number of an object under inspection. A single energy image yields only object radiographic density information, as contrasted to a dual energy image, which yields radiographic density and effective atomic number, $Z_{eff}$, of the object under inspection.

An alternative way to obtain $Z_{eff}$ information employs both the counting and integrating data from the transmission detector to find the mean energy of the detected X-rays. A third method, analogous to the dual energy technique, combines the transmission and backscatter data. Combinations of different ones of the above methods could be carried out to further discriminate among different materials being inspected. Combining the information from the backscatter data and $Z_{eff}$ data can further enhance discrimination of different materials and aid in the separation of overlaying materials of different atomic number Z.

By employing scintillators for X-ray detection that are relatively fast and efficient and reduce pixel-to-pixel crosstalk, the present system provides significantly improved image resolution. Detector design is also improved by the use of optically adiabatic scintillators. The system employs both photon-counting and photon integration modes to reduce noise and significantly increase overall image quality. Preferably, the modes are simultaneously active. As a further option, the system automatically adjusts belt speed (i) to allow rapid entrance into the inspection zone, (ii) slow traverse through the inspection zone to prolong residence therein of articles appointed for inspection, and (iii) allow rapid exit from the inspection zone. This automatic belt speed adjustment feature affords increased resolution and reduced noise with minimum speed penalty. Advantageously, the system provides a sharper and more quickly acquired image that affords improved capability for recognizing bombs, firearms and other weapons, currency, narcotics, incendiary materials, agents that pose biological, chemical, or radiological danger, and other contraband shapes and accompaniments.

BRIEF DESCRIPTION OF DRAWINGS

The invention will be more fully understood and further advantages will become apparent when reference is had to the following detailed description and the accompanying drawings, wherein like reference numerals denote similar elements throughout the several views, and in which:

FIG. 17 is a portion of computer code used to provide edge filtering in some embodiments;

DESCRIPTION OF THE PREFERRED EMBODIMENTS

The invention provides an apparatus and method for X-ray inspection systems that utilize radiation transmitted through and scattered from the object under inspection to detect weapons, narcotics, explosives or other contraband.

Figure 1:
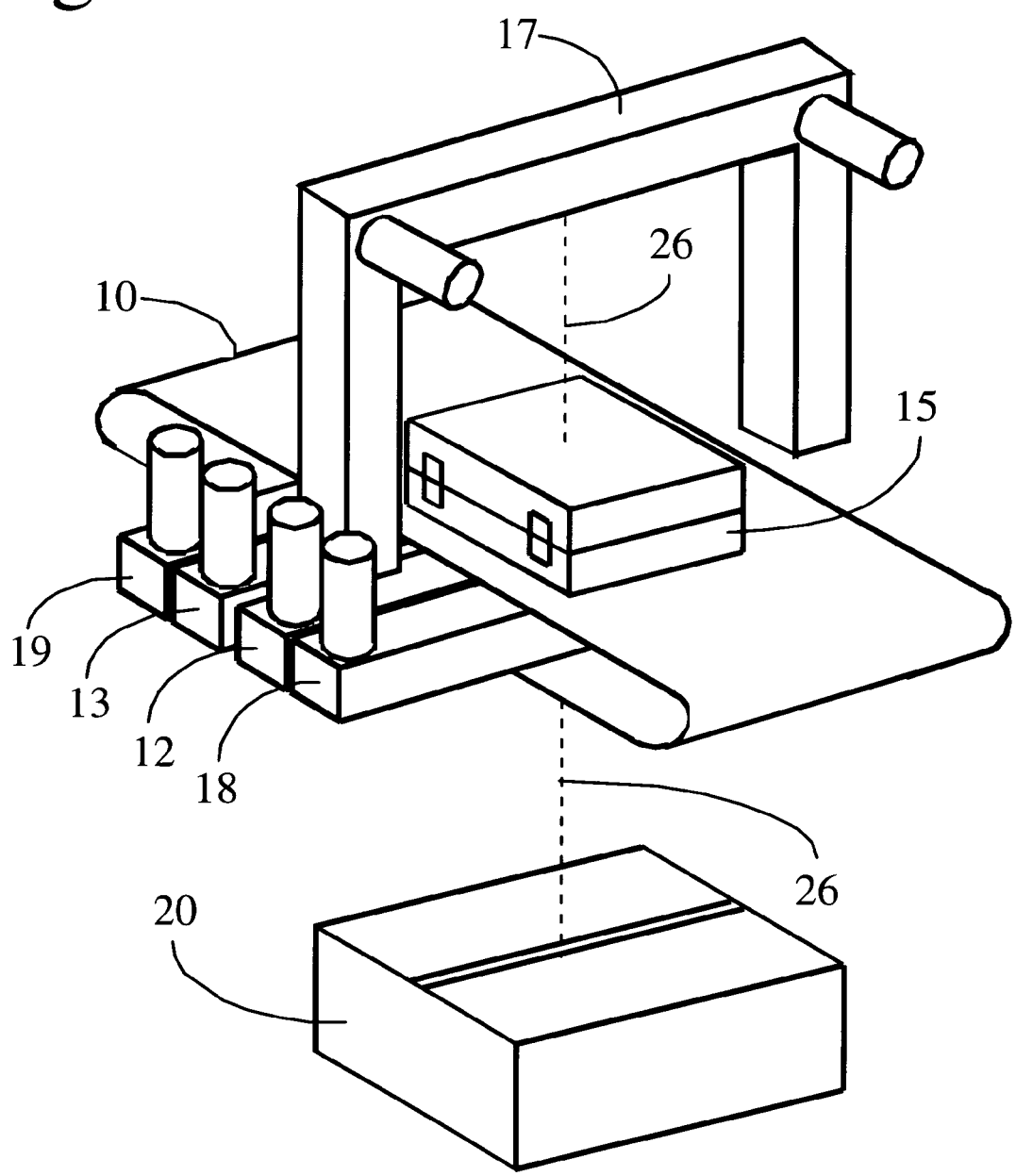
FIG. 1 is a perspective view depicting an overview of an embodiment of an X-ray inspection system of the invention using transmitted and Compton backscattered radiation.
Figure 2:
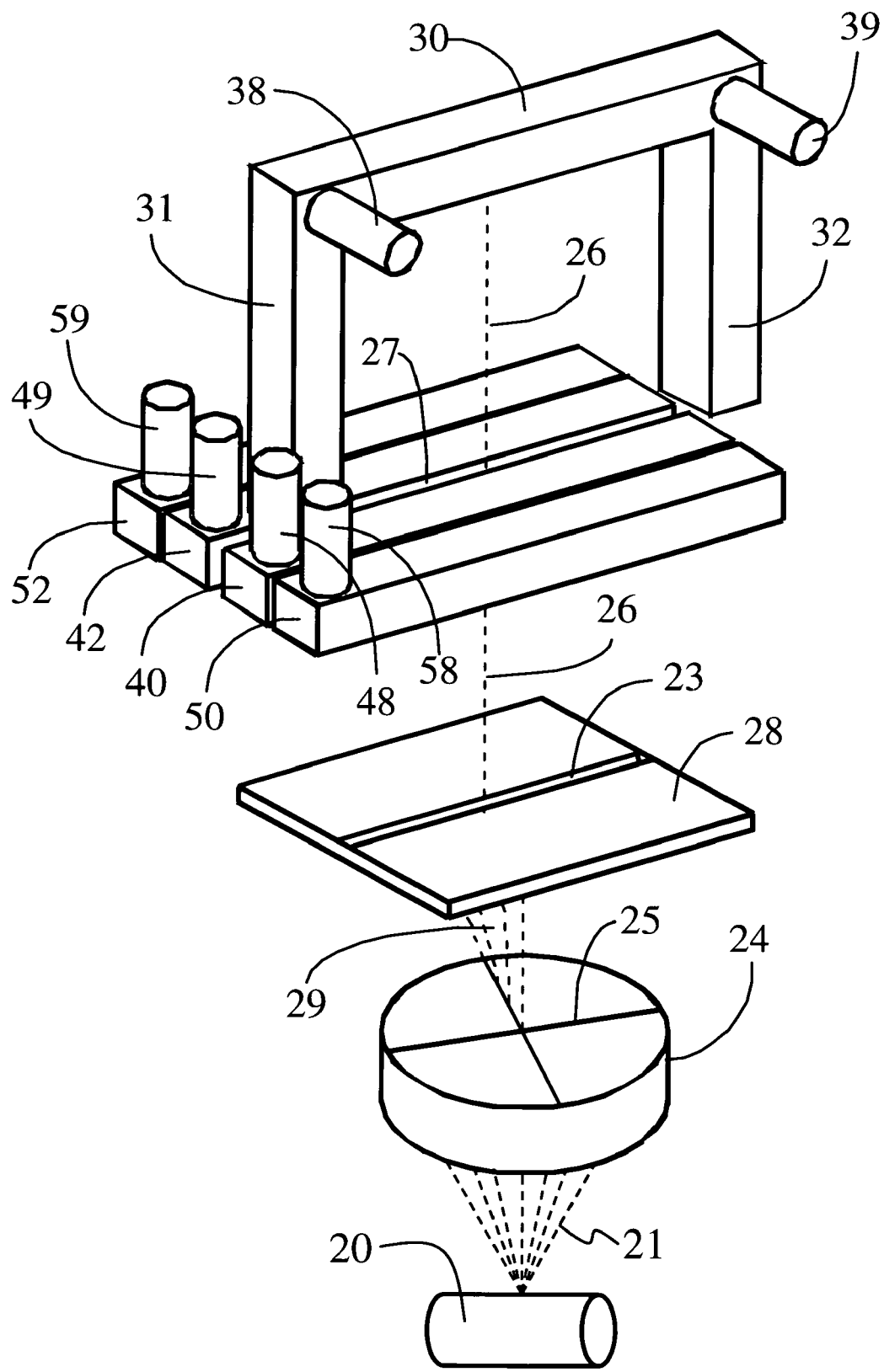
FIG. 2 is a perspective view showing the arrangement of X-ray generator and pencil beam shaping components of the detector of FIG. 1.

Specifically, the invention provides in one aspect a scanning X-ray inspection system, such as the embodiment shown in FIGS. 1 and 2, that includes transmission and backscatter detectors. The system has a transport means, such as conveyor 10, for moving object 15 to be scanned though the system. Object 15 is typically an item of luggage such as a suitcase carried by a traveler. Luggage and small parcel scanning systems ordinarily employ a tunnel that provides the configuration required for the detectors and other system components. The scanned items are moved by the conveyor through the tunnel. However, any other item such as cargo, freight, boxes, cartons, envelopes, crates, inter-modal containers, vehicles, packages, personal articles, and the like, appointed for transport on aircraft, rail, ship, truck, bus or other like public conveyance, may also be scanned. For scanning large-scale items, the various system components are preferably configured on other suitable structures, such as an archway, avoiding the need for a tunnel and conveyor belt. The system is also useful for inspecting items to be carried into or delivered to any other public venue such as a courthouse, stadium, auditorium, or like facility.

The conveyor used in some embodiments of the present invention is preferably a belt conveyor of the type known in the art. The belt preferably is thin and made of suitable fabric, polymer, rubber, or other similar pliable substance that has a low X-ray absorbance. Alternatively, the belt may be formed of a mesh or may comprise chains or the like at its lateral edges that connect transverse slats on which items being conveyed are supported.

As best seen in FIG. 2, X-ray generation device 20 generates a pencil beam of X-rays 26. X-ray generation device 20 is known in the art and generally comprises an X-ray tube within or behind rotating wheel 24 having at least one slit, and preferably a plurality of slits 25 from which a fan of X-rays 29 is emitted. Wheel 24 preferably rotates about a central axis, which is generally vertically oriented in the embodiment shown. X-ray shield 28 is provided with fixed slit 23, from which sweeping pencil beam 26 emerges. The combination of rotating slits 25 and fixed slit 23 acts to collimate the X-rays emanating from device 20 into pencil beam 26 that repetitively sweeps along and through pencil beam entrance slit 27 across conveyor 10. The scanning direction of the pencil beam 26 is substantially perpendicular to the object's movement. Although it is preferred that the scanning and object movement directions be exactly perpendicular, an oblique sweeping would suffice, as long as the region of the object appointed to be interrogated receives sufficient coverage. In this manner, object 15 is repeatedly scanned as it moves on conveyor 10. In conjunction with suitable detectors and electronics as will be further described, the system permits the acquisition of two-dimensional, raster-scanned images of both the transmission and backscattering of X-rays by the object. X-ray detection and acquisition are synchronized with the rotation of wheel 24, such that with the passage of each slit 25 past fixed slit 27, the pencil beam traverses the object once, resulting in acquisition of one line of the raster scanned image.

Preferably, the X-ray source is located beneath conveyer belt 10 and the beam is upwardly directed, but other arrangements, in which the beam is horizontally or downwardly directed and the detectors are correspondingly disposed, are also possible. Other configurations of the X-ray generating and collimating system are also known, including ones in which the X-ray beam passes first through a fixed slit and thereafter through slits of a flat rotating wheel.

Figure 9A:
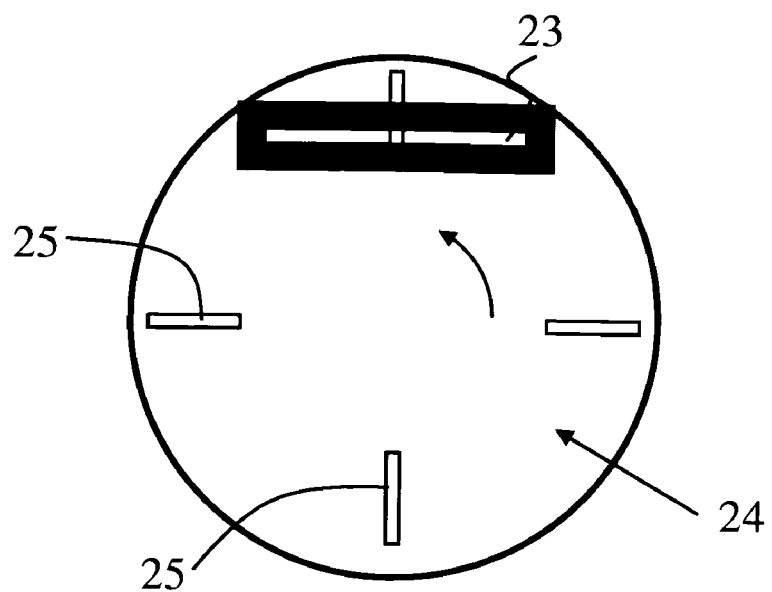
FIG. 9A is a schematic, plan view of a collimation system used in the present system.
Figure 9B:
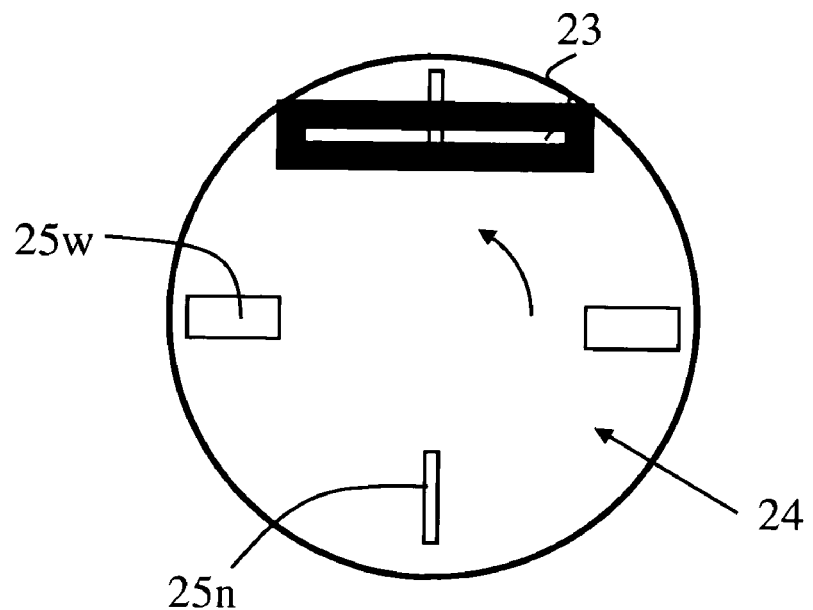
FIG. 9B is a schematic, plan view of an alternative collimation system used in the present system.

In some embodiments, e.g. as shown in FIG. 9A, the slits 25 in wheel 24 are substantially identical in size, so that one raster line of each of the transmission and backscattering images may be captured simultaneously for each beam traversal. Although wheel 24 is shown with four slits 25, it will be understood that configurations with other numbers of slits are also possible. Other embodiments of the present system, such as that depicted by FIG. 9B, employ a modified form of wheel 24', in which the slit openings alternate between wide slits 25w and narrow slits 25n. As a result, the rotation of wheel 24' produces scanning pencil beams that alternate between narrow and wide sizes. The resulting beam configuration is beneficially used in conjunction with a raster scanning system and electronics that acquire raster-scan lines for the transmission and backscatter images alternately and in synchrony with illumination of the interrogated object with the narrow and wide beam sizes respectively. Optionally, transmission data are acquired only during the period of illumination through the narrow slits, with backscatter data being acquired during illumination through both narrow and wide slits. In another embodiment, the transmission image is formed using data acquired during illumination through only the narrow slit, but transmission data acquired during both are employed in the calculation of $Z_{\it{eff}}$ and other image enhancement functions.

Implementations that entail two slit sizes provide an improved system optimization, balancing the benefits of both good spatial resolution in the transmission channel and enhanced signal quality in the backscatter channel. In general, it is desirable to obtain the transmission image with high spatial resolution, for which a small beam size is important. Signal intensity in the transmitted image ordinarily is not a difficulty. By way of contrast, backscattering inherently results in a weaker signal intensity, in which the noise arising from both Poisson counting statistics and electronic noise play a greater role. Using a larger beam size increases the total flux intensity in the incident pencil X-ray beam, resulting in a proportionately increased signal count in each pixel. It is found that the concomitant decrease of spatial resolution in the backscatter image does not markedly impair the ability of the present system to detect contraband, in part because the organic materials for which backscatter detection plays the dominant role are typically larger in size and/or more widely dispersed than the metallic objects identified predominantly using the transmission image. Furthermore, it has been found that once an operator is alerted to the presence of low Z objects in the backscattering image, the operator can often recognize the shapes of such objects in the transmission image as well, either by direct observation or by suitable automated identification or recognition techniques.

Fast backscatter detectors 12 and 13 generate a backscatter signal when detecting X-rays backscattered by object 15. The fast backscatter detectors 12 and 13 are positioned on the same side of the moving object 15 as the X-ray generation device 20 and across from each other and proximate to pencil beam entrance slit 27. Preferably, the fast backscatter detectors 12 and 13 are proximate to (and more preferably, substantially parallel to) pencil beam entrance slit 27 and are comprised of scintillators 40 and 42 and photon detectors 48 and 49 respectively. Scintillators 40 and 42 are comprised of suitable organic plastic, which may be either unloaded or loaded, e.g. with lead or tin. These scintillators convert some portion of the incident backscatter X-ray photons into light photons, which are then conducted through the scintillators. Photon detectors 48 and 49 are preferably photomultiplier tubes (PMTs) that convert these light photons into electrical backscatter signals. Alternatively, scintillators 40 and 42 are comprised of short persistence phosphor such as $Gd_2SiO_5$ or $Y_2SiO_5$. Optionally, only one backscatter detector is used.

Figure 8:
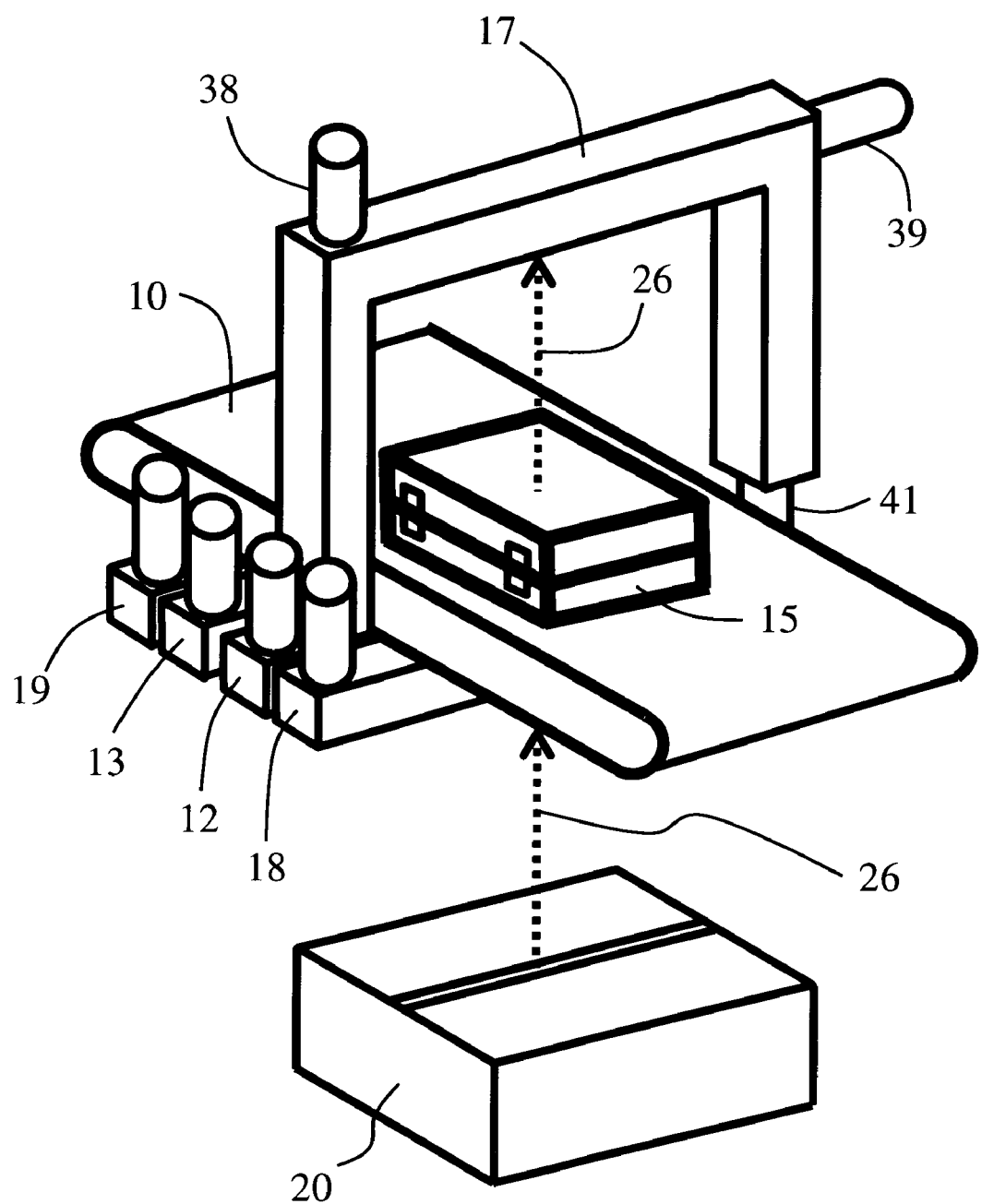
FIG. 8 is a perspective view of yet another embodiment of the X-ray inspection system of the invention.

As shown in FIGS. 1 and 2, transmission detector 17 is used to generate a transmission signal by detecting those X-ray photons in beam 26 that pass through object 15 substantially undeviated in direction and without being absorbed or scattered by object 15. The transmission detector 17 is positioned on the opposite side of object 15 as backscatter detectors 12 and 13. In this manner, object 15 moves between the transmission detector 17 and backscatter detectors 12 and 13. Preferably, transmission detector 17 is comprised of scintillators 30, 31, and 32 and photon detectors 38 and 39. Other placements of the photon detectors may also be employed. Backscatter detectors 12, 13 preferably have a relatively large acceptance solid angle to improve the backscatter signal level. Transmission detector 17 may have a size in the width dimension (perpendicular the sweep direction) that is as small as the pencil beam cross section. However, it is preferred that a low-Z scintillator-based transmission detector, in which Compton scatter is the dominant X-ray interaction process, have a large total volume of scintillator material that extends outside the immediate path of the incident beam. This configuration permits capture of radiation detected from X-ray photons in the transmission beam that are Compton-scattered within the scintillator, as well photons in the direct beam path that are absorbed. In the embodiment depicted by FIG. 8, three photon detectors 38, 39, 41 are disposed along axes of the scintillators. The photon detectors may be directly optically coupled to the scintillators as shown. Alternatively (not shown), one or more of the photon detectors may be coupled to the scintillator via an intervening light pipe to provide a more compact overall arrangement. Scintillators 30, 31, and 32 are comprised of organic plastic, and are arranged in a U shape, as shown in FIG. 2. Photon detectors 38 and 39 are preferably photomultipliers. Alternatively, scintillators 30, 31, and 32 are comprised of short persistence phosphors such as $Gd_2SiO_5$ or $Y_2SiO_5$. In preferred implementations, both the transmission and backscatter scintillator materials are larger in size than the incident pencil beam. A large backscatter detector is desirable to increase the solid angle over which it is sensitive, so it collects more scattered X-ray photons, thereby improving counting statistics. The transmission detector may also have an acceptance in the direction perpendicular the sweeping direction that is larger than the small pencil beam to facilitate alignment and stability and increase the generation of secondary scintillation light. The transmission acceptance may be determined by the total size of the scintillator or optionally by slits that define an area generally elongated in the sweeping direction.

The embodiment of the present system depicted by FIGS. 1 and 2 provides an X-ray beam directed generally upward from the radiation source. This configuration beneficially reduces the horizontal width of the system, e.g. permitting it to be transported through narrow doorways. However, in some applications, it is preferred to have the beam direction be generally horizontal and transverse the direction of conveyor belt advance. Still other configurations, including a downwardly directed beam are also possible. The transmission and scatter detectors in any of these embodiments must be positioned accordingly.

Figure 3:
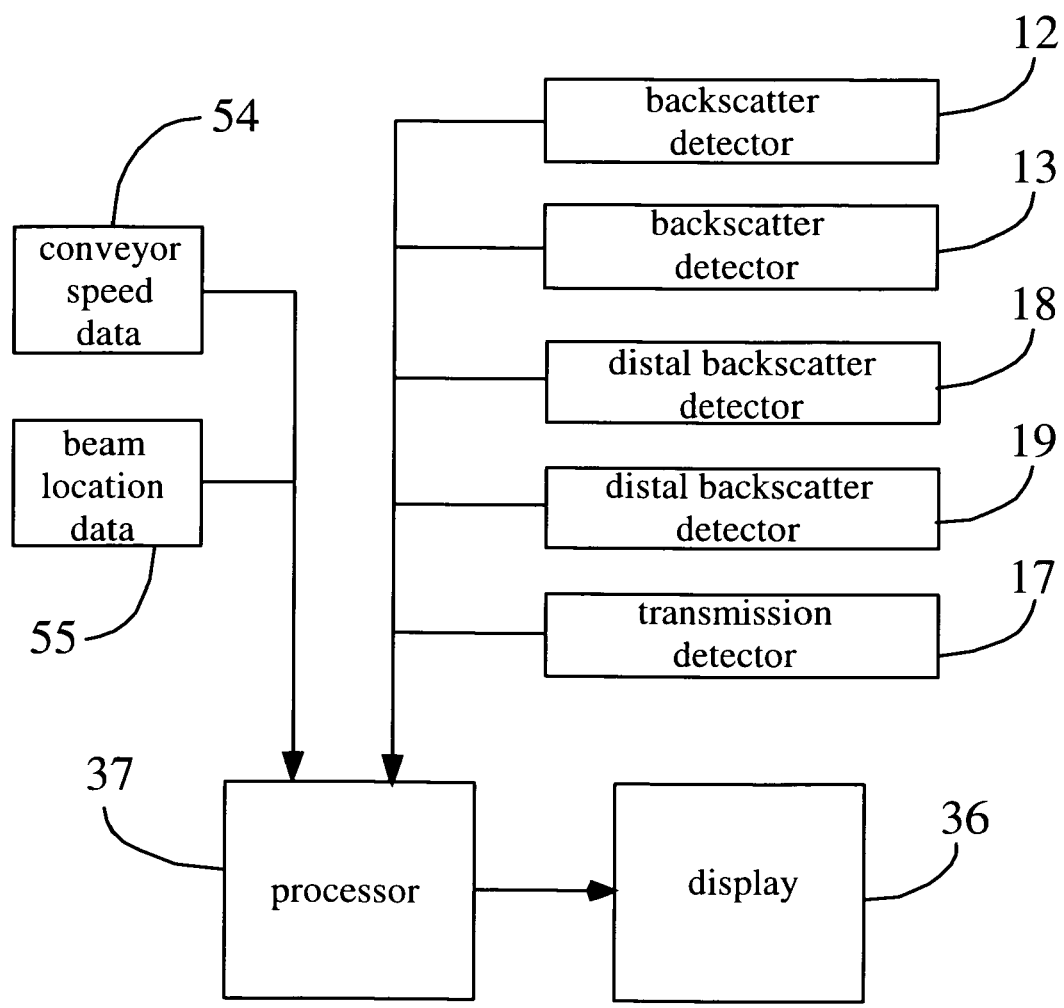
FIG. 3 is a block diagram illustrating a possible signal flow for the system of FIG. 1.

Referring now to FIG. 3, processor 37 processes the backscatter and transmission signals received from their respective detectors into a format suitable for display on display means 36. Preferably, display means 36 is a CRT or LCD display. In some implementations, processor 37 is automatically switchable between photon counting and photon integration modes, preferably using the soft-switching technique described below. Optionally, the switching is accomplished manually. Pencil beam location data 55 provides processor 37 with information on the location of the beam. Speed data 54 provides processor 37 with information on the speed of conveyor 10.

The reconstructed images of the transmission signal, backscatter signal, and the distal backscatter signal can be displayed separately or as a combined image showing suspicious material as a colored area.

Figure 4:
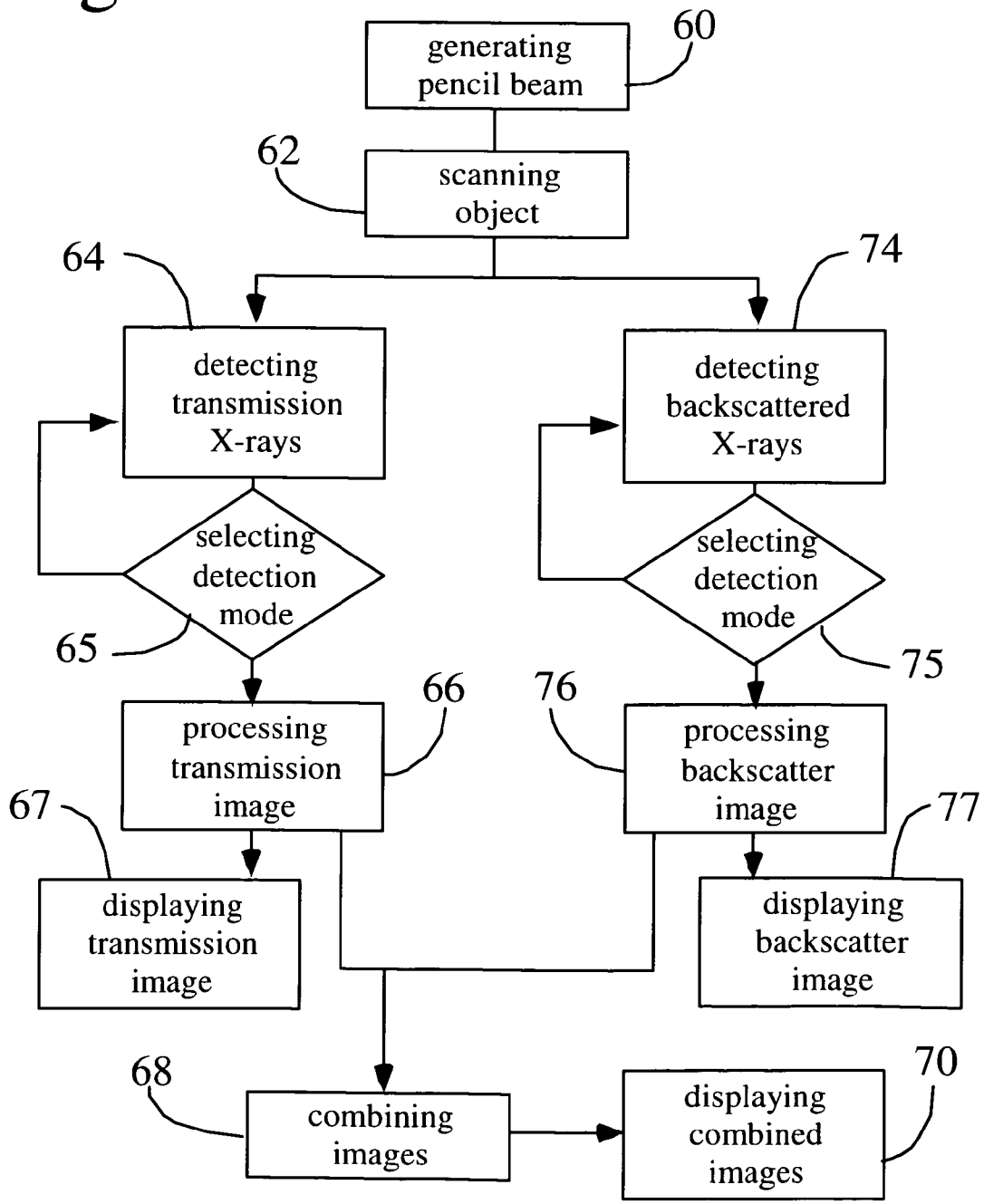
FIG. 4 is a block diagram depicting a method of the invention for X-ray inspection of an object using transmitted and Compton backscattered radiation.

A method to carry out X-ray inspection of an object using transmitted and Compton backscattered radiation in accordance with the invention is shown in FIG. 4. A pencil beam of X-rays is generated 60 and scanned 62 across the object to be inspected. X-rays transmitted through the object are detected 64 using a fast transmission detector. A mode of detection 65 is selected from either photon integration or photon counting. X-rays backscattered from the object are detected 74 using a fast backscatter detector, and a mode of detection 75 is selected from either photon integration or photon counting. Optionally, mode selection is omitted for the backscatter image. Both the scatter and transmission data are stored in a read-write memory as discrete pixels in corresponding signal arrays. Ordinarily, the memory is provided in a processor, which may be a general-purpose computer, microprocessor, microcontroller, application-specific integrated circuit, or other like processing device. However, any form of magnetic, magneooptic, semiconductor, or other computer-like memory can be used, as can memory implemented through a computer network. Typically, the processor is programmed to carry out the required computations and data processing needed to drive the display. Other system operating functions may be carried out using the same processor or another separate controller.

Next, a transmission image is formed by processing 66 of the detected transmission X-rays and displayed 67. A backscattered image is formed by processing 76 of the detected backscattered X-rays and displaying 77. Optionally, the processed transmission and backscatter images are combined 68 and displayed 70 as a composite image.

Optionally, additional scintillation detectors at the top and sides, in close proximity with the scintillation detectors for the transmitted radiation, create additional tomographic layers of resolution and improve the transmission image. The improvement is especially advantageous for objects that that are closer to the forward scatter detectors than the backscattered detectors and for low-Z objects that are shielded from the backscatter detector by higher-Z objects. The forward scatter is measured and used as a correction for the transmitted radiance detector, which automatically captures forward scatter together with the transmitted radiation. Since the transmission scintillator detector system is divided into sections, those sections which are not currently collecting transmission image information can be used to collect scattered X-rays in the forward direction. The detection of these scattered X-rays can also be used to improve the backscatter image or used to create an additional tomographic layer.

Figure 5:
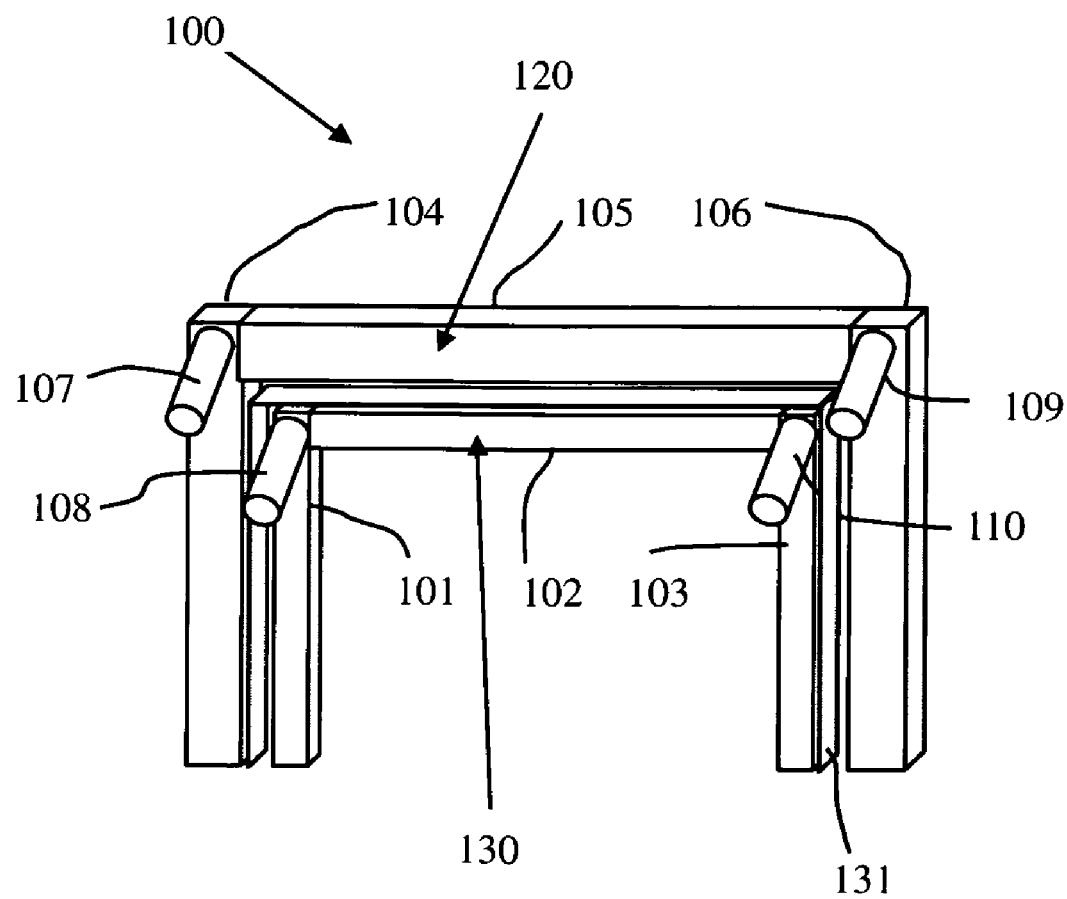
FIG. 5 is a perspective view illustrating a dual energy transmitted radiation detector for providing a dual energy image containing radiographic density and atomic number information of an object under inspection.

In FIG. 5 there is shown a detector configuration 100 for obtaining dual energy information by properly adjusting the thickness of inner transmission detector 130 and outer transmission detector 120. Inner detector 130 is generally U shaped, and comprises scintillators 101, 102, and 103, as well as photodetectors 108 and 110. Outer detector 120 comprises scintillators 104, 105 and 106, as well as photodetectors, 107 and 109. The transmitted pencil X-ray beam first interacts with the inner detector 130. By suitably selecting the detector material and thickness the inner detector 130 will preferably absorb lower energy. Material and thickness of outer detector 120 are suitably selected to absorb the higher energy X-rays that traverse and exit inner detector 130. Alternatively, a sheet of filtering material, such as copper, steel or the like, could be disposed between the inner detector 130 and outer detector 120 to increase discrimination between the high and low energy photons. The signal strengths of the inner and outer detectors are compared to determine the average atomic number $Z_{\mathit{eff}}$ of the object. Further comparison of the dual energy information and scatter information gives a more accurate Z determination and aids in separating overlying materials. Other methods detailed below can be used in the practice of the invention to determine $Z_{\mathit{eff}}$. In some instances a combination of these methods permits an improved or more accurate determination of $Z_{\mathit{eff}}$ than could be done by any of the methods by itself.

Figure 6:
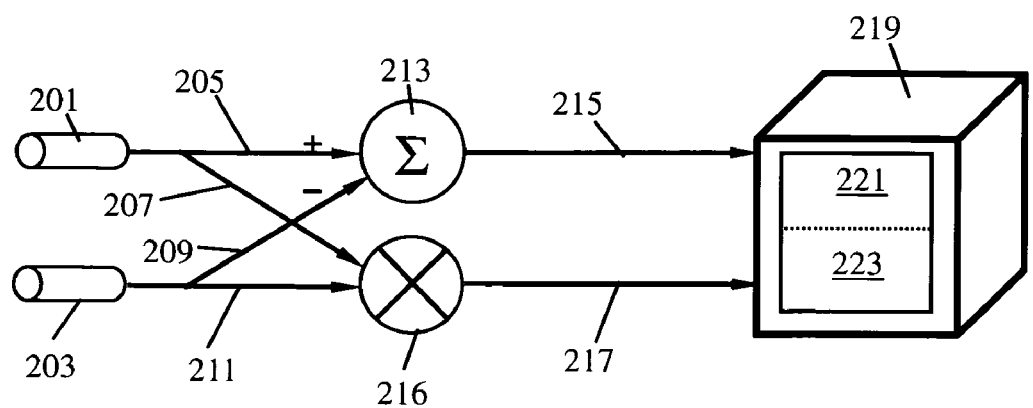
FIG. 6 is a diagrammatic view depicting a transmission detector and generated transmission signal, which is combined with a scatter correction signal in a summing device to produce and display a transmission signal in a transmission image window of a monitor in an embodiment of the present system.

In FIG. 6 there is shown an implementation that comprises a transmission detector 201 generating transmission signal 205 and a backscatter detector 203 generating scatter signal 211. Transmission signal 205 is combined with scatter correction signal 209 in summing device 213. A corrected transmission signal 215 is displayed in transmission image window 221 on monitor 219. Backscatter signal 211 is combined with attenuation correction signal 207 in multiplier 216. A corrected backscatter signal 217 is displayed in backscatter image window 223.

Figure 7:
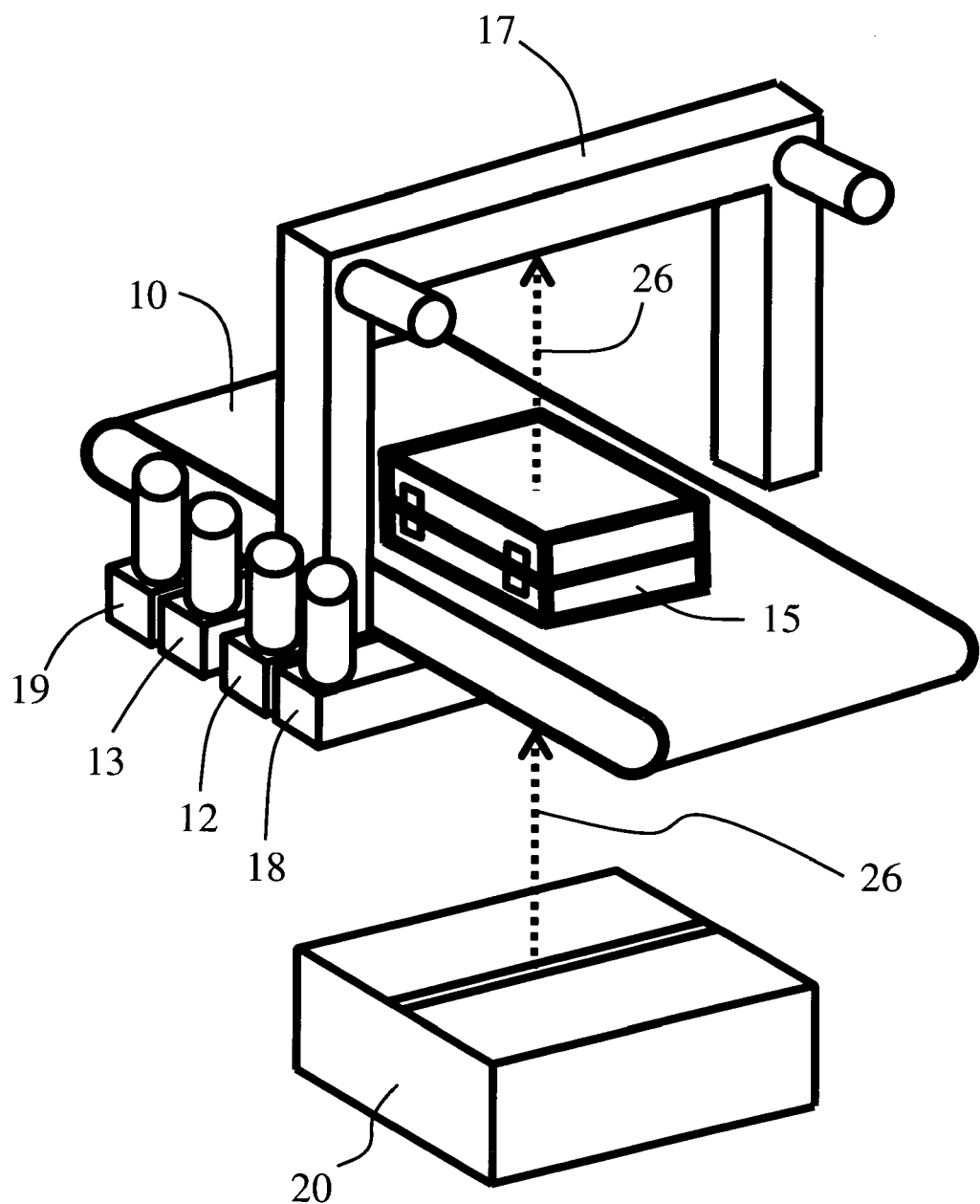
FIG. 7 is a perspective view of another embodiment of the X-ray inspection system of the invention.

In another embodiment of the apparatus of the invention depicted by FIG. 7, both X-ray source 20 and fast backscatter detectors 12, 13, 18, and 19 are disposed outside the belt of conveyor 10 and on the same side of the belt as source 20. Such a position permits greater access to the detectors for servicing, adjustment, and the like.

In another aspect, there is provided an X-ray inspection system wherein the transmitted radiation detector also functions in part as a detector of forward scattered Compton radiation. Such systems may employ multiple, independently operable detectors or a segmented detector of transmitted radiation, while still maintaining a compact overall configuration. In such systems, which are especially valuable for inspecting large objects, it is usual that as the pencil beam is swept, radiation is directed at only one detector of transmitted radiation at any given time. This allows the use of any detector of transmitted radiation that has no direct radiation impinging at a given time to function as a detector of forward scattered radiation. Preferably, the system processor is used to activate the appropriate transmission detectors in synchrony with the rotation of the collimating wheel, which dictates the instantaneous position of the scanning pencil beam. One or more detector portions in line with the instantaneous beam direction are activated to collect transmitted signal, while other appropriate portions are activated to detect forward scattered radiation. The information derived from the forward-scattered radiation can improve the speed and accuracy of inspection, as the forward scatter signal is optionally combined with the backscatter signal. The forward scatter signal can also aid in the determination of $Z_{\mathit{eff}}$ by making possible the use of suitable combinations of forward scattered, transmitted and backscattered signals.

For example, referring to FIG. 2, during the part of the oscillation of the pencil beam, only scintillator portion 30 receives direct radiation, while portions 31 and 32 receive forward (or sideways) scattered radiation. When the beam is at scintillator portion 31, portions 30 and 32 receive scattered radiation. When the beam is at scintillator portion 32, both 30 and 31 would be used for forward scatter. When the pencil beam is at the corner of 30 and 31, only 32 could be used. No additional hardware would be needed.

In general, the detection of X-rays in a scintillation detector is based on the detection of light produced by photoelectric absorption. However, for low-Z plastic scintillator materials, the dominant X-ray interaction process is Compton scatter, leading to several important considerations in the design of detectors that are efficient and produce high-quality images.

After being Compton-scattered within a scintillator material, an X-ray photon can subsequently follow the same three possible paths (or combinations thereof) as it would if scattered in an interrogated sample itself. One path is photo absorption of the scatter X-ray, which results in full absorption of the initial X-ray energy and creation of detectable scintillation light. Second, the scattered X-ray photon can undergo another Compton scatter event, so that only some part of its initial energy is absorbed by the detector. Finally, the scattered X-ray can simply pass through the detector without any further interaction, thus generating no signal. To further maximize the quantum efficiency of the detector, it is desirable to minimize the number of initial X-rays that go undetected, either because they pass directly through the detector without being immediately photo absorbed or exit the detector after being Compton scattered without producing a signal that can be detected. Improving the detector's quantum efficiency would result in higher quality images. In addition, X-rays Compton-scattered from the transmission detector can enter a scatter detector as a spurious noise source, since they cannot be distinguished there from X-rays Compton-scattered from the sample being interrogated.

To counter the latter, it has been found advantageous to surround the detector of transmitted radiation with a shielded enclosure that has an aperture only sufficient to admit the transmitted energy beam. The shielded enclosure and aperture are constructed so that no substantial amount of radiation scattered within the transmission detector can escape in a direction that permits it to enter the scattered radiation detector.

However, if the detector of transmitted radiation is so enclosed, it will not function efficiently as a detector of forward- or side-scattered radiation in embodiments using the transmission detector to carry out both functions. As an alternative to the shielded enclosure, directional vanes may be arranged so as to admit the desired transmitted and scattered radiation, while preventing the re-emission of the undesired radiation that is scattered from within the detector of transmitted radiation. The vanes may be parallel, or preferably arranged so as to converge at the location of the desired scattered radiation. This arrangement is similar to the focused Potter-Bucky grid commonly used to reduce the effects of undesired scattered radiation in radiography.

Figure 11A:
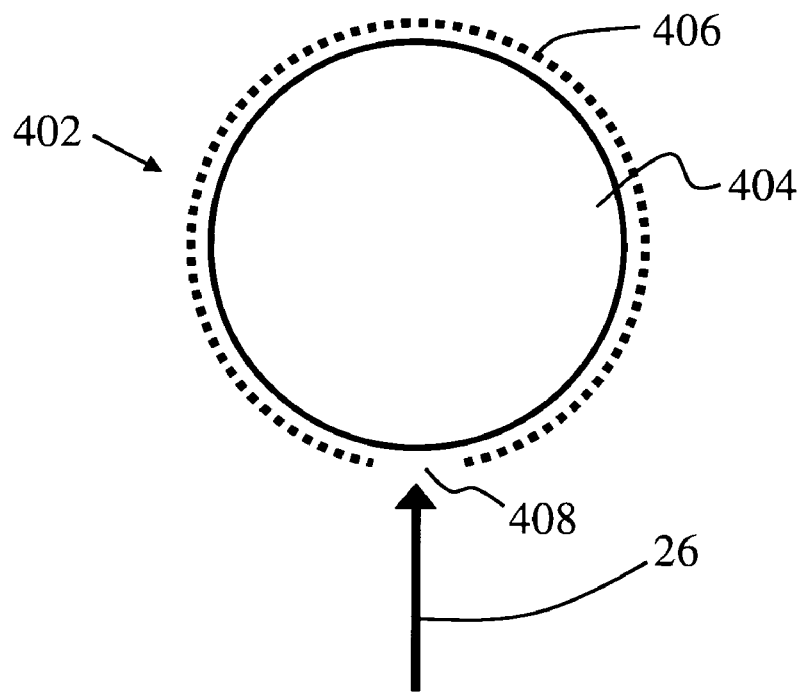
FIG. 11A is a cross-sectional view of a scintillator detector system usable in the present system.
Figure 11B:
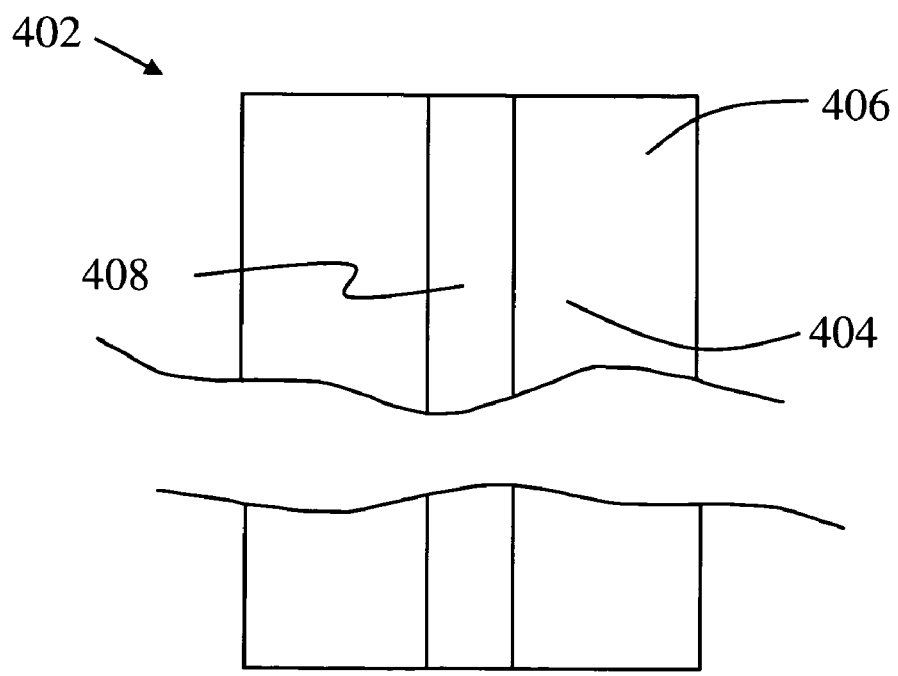
FIG. 11B is a view of the detector system of FIG. 11A in side elevation.

One approach for improving detector efficiency by mitigating the loss of X-rays without interaction entails wrapping or otherwise enclosing a substantial portion of one or both of the scatter and transmission plastic scintillators in a fast scintillating, short persistence phosphor comprising a high-Z material. As best seen in FIGS. 11A and 11B, with reference to transmission detector 402, an entrance slit 408 in the phosphor wrapping 406 allows passage of the pencil beam into generally cylindrical scintillator material 404 of transmission detector 402. For a scatter detector, the scintillating phosphor would be omitted on the side facing the scattering object for similar reasons. The placement of the scintillating phosphor around the plastic scintillator permits capture of some of the initial X-rays that otherwise would have passed through the detector without interaction, as well as some of the X-rays that would have escaped the plastic scintillator after undergoing Compton scatter. Some of the scintillation light, which is emitted by the phosphor isotropically, enters the plastic scintillator, and thence is light-guided to the PMT. It should be noted that since the scintillating phosphor is composed of high-Z material, photo absorption is its dominant X-ray interaction.

Still a further implementation of the scintillation detectors used in the present system entails a wave-shifting material interposed between the main scintillator and the PMT detector. The ideal geometry for maximum efficiency in the collection of visible light photons from an elongated scintillator bar is to have the PMT mounted on the end of the bar. In this configuration, light photons constrained by total internal reflection to travel down the length of the scintillator will hit the scintillator/PMT interface with a large angle, thereby preventing internal reflection of the light photon. However, such an arrangement of scintillator/PMT geometry results in a large overall length of the detection system, and thus the entire system. On the other hand, in many circumstances a compact system is desired, so that it can be installed even in limited space and moved through narrow existing doorways or elevators.

Figure 10A:
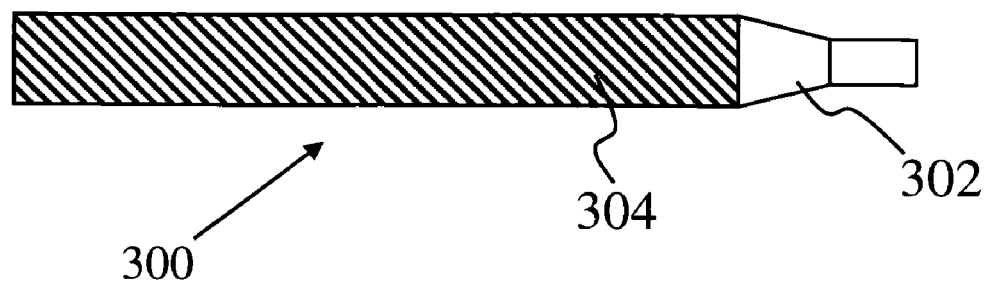
FIG. 10A is a plan view of a scintillator system incorporated in some embodiments of the invention.
Figure 10B:
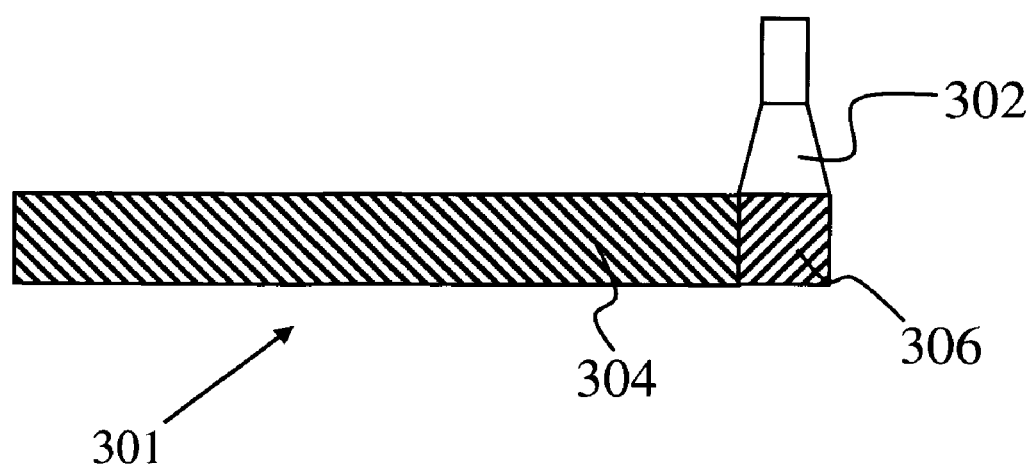
FIG. 10B is a plan view of a scintillator system that includes a waveshifting material incorporated in some embodiments of the invention.

FIG. 10A illustrates a standard, linear configuration wherein PMT 302 is mounted on the end of scintillator bar 304. One possible alternate configuration is shown in FIG. 10B, which depicts wavelength-shifting material 306 optically coupled to scintillator 304. Light of wavelength $\lambda_1$ excited by scintillation in scintillator 304 and propagating along its length emerges into wavelength-shifting material 306, wherein it produces scintillation light with new wavelength $\lambda_2 > \lambda_1$. The new light is re-radiated substantially isotropically, and thus enters PMT 302. This configuration is beneficial in size-constrained applications, since the long direction of the PMT need not be coaxial with the scintillator to capture a preponderance of the propagating scintillation light. Other configurations in which wavelength shifting materials are beneficially employed may also be used.

In an implementation, the long scintillator bar 304 is formed of a scintillator material, such as that supplied by Saint-Gobain Crystals as BC-414 plastic scintillator material, which produces scintillation light having a peak scintillation wavelength of 392 nm. Saint-Gobain Crystals' BC-484 plastic scintillator is used as the wavelength shifting block 306. The BC-484 material exhibits a peak absorption at 375 nm and responds to incident light having wavelengths within its range of sensitivity by producing light of a slightly longer wavelength emitted isotropically and with a peak emission at 430 nm. Some of the scintillation photons exit directly from the long bar scintillator and enter the wavelength shifting scintillator block, where they are absorbed and reemitted isotropically as longer wavelength light. Other photons may be guided by being reflected by reflective material that preferably wraps the wavelength shifting scintillator. This wrapping material can be either of the specular reflection or diffuse reflection type.

For the purpose of capturing as many Compton scattered X-rays from the object being inspected as possible, it is desirable for the scatter detectors to have a large acceptance and effective detection area, since the scattered X-rays are emitted nearly isotropically at the X-ray energies ordinarily used. When designing scintillator based detectors several factors need to be considered. One is light collection efficiency, i.e. what percentage of the scintillation photons produced reaches the PMT. The geometry of the scintillator and the coupling of the PMT play an important role. For reasons obvious to those skilled in the art, one can not expect to simply increase the size of the scintillator to increase the effective detective area without taking into account resulting effects on the light collection efficiency. The optimal coupling is usually accomplished by matching the PMT size to the scintillator as best as possible. For larger effective detective areas it is not reasonable or cost effective to use very large PMTs to match the scintillator geometry. Therefore in an alternate embodiment of the present scatter detector 303 shown in FIGS. 10C and 10D, a large area organic plastic scintillator 310 is optically coupled on one or more sides to a wavelength-shifting element 306, which is in turn optically coupled to matching PMT 302. Optionally, scintillator 310 is surrounded on one or more other sides by a high-Z scintillating phosphor 312. Alternatively, the other sides are enclosed in a reflective material. Either diffuse or specular reflecting material may be used.

Wavelength shifter 306 accepts the visible photons that were emitted from the scintillating phosphor, absorbs and then reemits them at a slightly lower wavelength, isotropically. Some of these wavelength shifted photons will be guided down the wavelength shifter to the PMT for detection. Although, the conversion efficiency from the scintillating photons to the wavelength shifted photons is not 100%, this method effectively increases the relative size of the PMT that interfaces with the detection box.

Figure 10C:
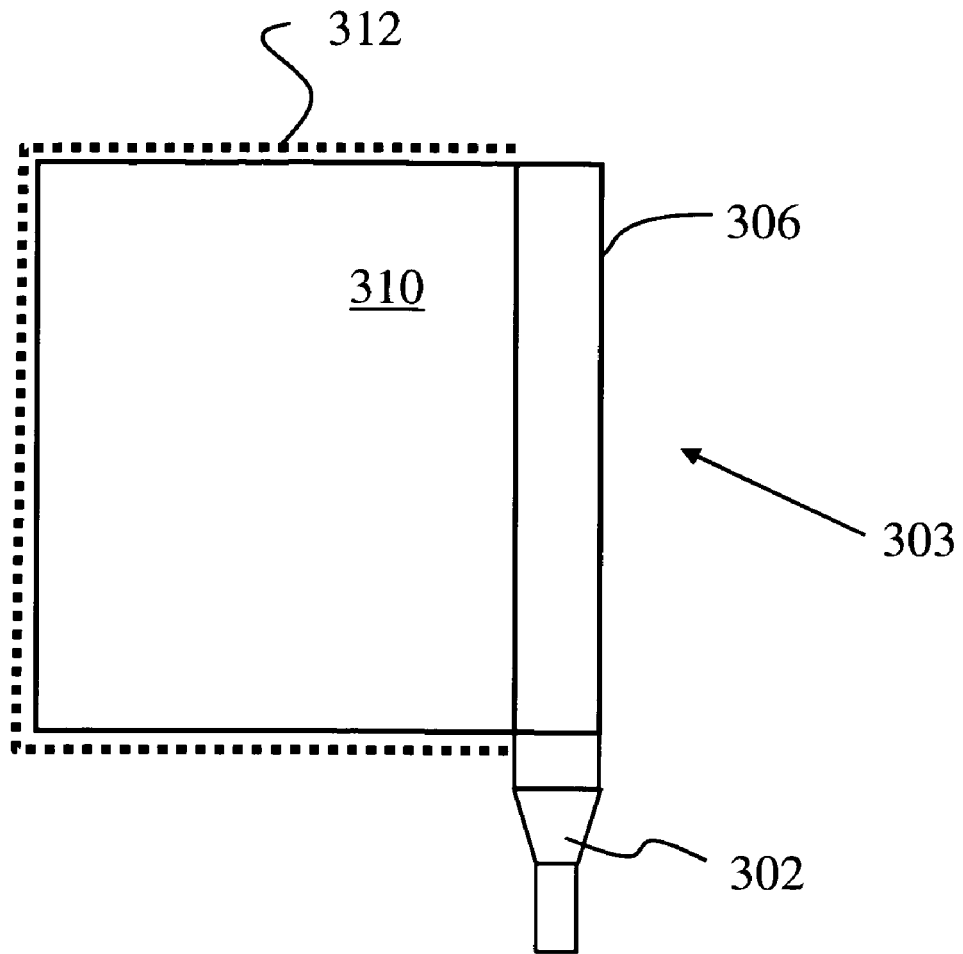
FIG. 10C is a perspective view of a scintillator detector system including a large area detector element that also uses fast phosphor or scintillator and wavelength shifting material.
Figure 10D:
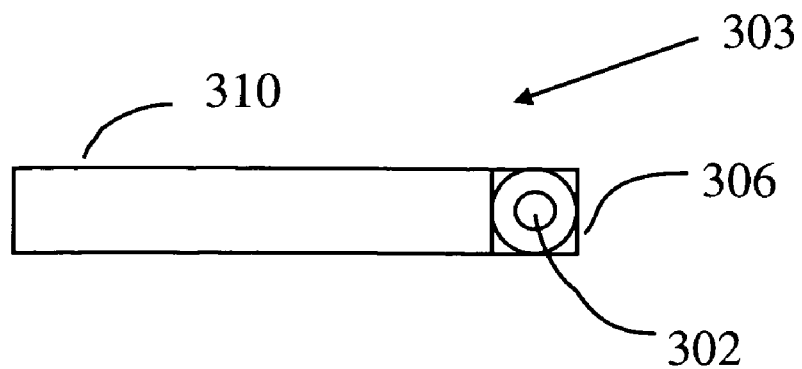
FIG. 10D is a side elevation view of the detector system shown in FIG. 10C.

Detector 303 of FIGS. 10C and 10D may also be formed by replacing scintillator element 310 with a generally open box having at least some of its sides lined with a scintillating phosphor. Some of the scintillation light produced by this phosphor enters wavelength shifting element 306 for detection by PMT 302.

Scintillator-based screening systems frequently employ a photomultiplier tube (PMT) as the detector. Photons exiting the scintillator impinge on the cathode of the PMT, causing electrons to be emitted by the photoelectric effect. These electrons, in turn, interact with the PMT's dynode structure to cause a multiplicative cascade of electrons that finally reach the PMT anode, where they are collected to produce an electrical signal. This signal typically is received by external electronics for further amplification and signal processing. At low incident X-ray flux, individual pulses can be detected, each pulse corresponding to the interaction of a single X-ray photon interacting with the scintillator. This mode of signal acquisition is termed photon counting mode, or simply counting mode. Above a certain level of X-ray flux, it becomes impossible to count individual X-rays, because the output pulses overlap, and so cannot be resolved individually. This condition is termed pulse pileup. Concomitantly, there may be a DC shift of the signal due to the high rate, which could affect any pulse size threshold used to discriminate between true count events and incidental electronic noise.

For these reasons, an alternate signal acquisition mode termed integration mode may be used. Instead of counting individual pulses, the electronic signal is summed or integrated for a preset interval of time. However, the signal in integration mode is fully reliable only at relatively high X-ray flux. At low flux, electrical noise (mostly from the PMT itself) may be at a level comparable to the actual signal, but the integration process is unable to distinguish noise from the true signal. The integration output thus contains both, making it unrepresentative of the true signal level. At the lowest rates, the noise contribution dominates and may even completely mask the true signal. The true signal may also be confounded by the variable sizes of the pulses being integrated. At very high rates, this noise contribution tends to average out, but at low rates, the true signal is further corrupted.

As a result, conventional screening systems have frequently employed only photon counting or integration mode for signal acquisition. Having the choice of both enables the achievement of better dynamic range and accuracy. Automatic selection between the two modes has typically been based on some predetermined intensity threshold: below the threshold, counting is used, while above the threshold, integration is selected.

However, the selection and switching process itself can introduce artifacts and uncertainty in the data, especially for intensities near the threshold. For example, in a conveyor-based scanning system, the transmitted intensity drops very rapidly as a highly absorbing object passes in front of the detector. During the transition, corresponding to the passage of the item's leading edge, the system is highly likely to hunt between the detection modes, leading to spurious intensity discontinuities. A similar effect occurs as the item's trailing edge passes the detector. Hunting is also likely to occur when scanning an object that has a nearly constant attenuation that produces a transmission level near the set threshold. The viability of mode switching is limited by the need to ensure that the outputs of the system in integration and counting modes are closely matched at the threshold intensity. However, statistical fluctuations and the rapid change in true intensity as objects pass into view during scanning inevitably compromise the integrity of the data. For the known method to work, very strict restrictions are required for calibrating the counting signal and the integrated signal to a common reference and minimizing any offset between the signals. In addition this calibration must be very stable over both short and long periods of time. Without these restrictions the image data may appear to be discontinuous and may appear particularly noisy and possibly unintelligible at intensities at or near the switching thresholds. Any jumping back and forth between counting mode and integrating mode over extended periods of time leads to discontinuities that are artifactual, and do not represent a true absorption profile. The resulting corruption of the edges of objects being scanned greatly hampers the ability of an operator to rapidly identify objects during normal use of the system, and reduces the likelihood that appropriate responsive action will be taken.

However, it is found that the difficulties associated with switching can be largely, if not completely, mitigated by a soft-switching approach in which counting and integration modes are simultaneously operative, with the data output determined by a suitably weighted combination of the signal outputs from each of the detection modes. Soft switching is sometimes termed blending of modes.

Figure 12A:
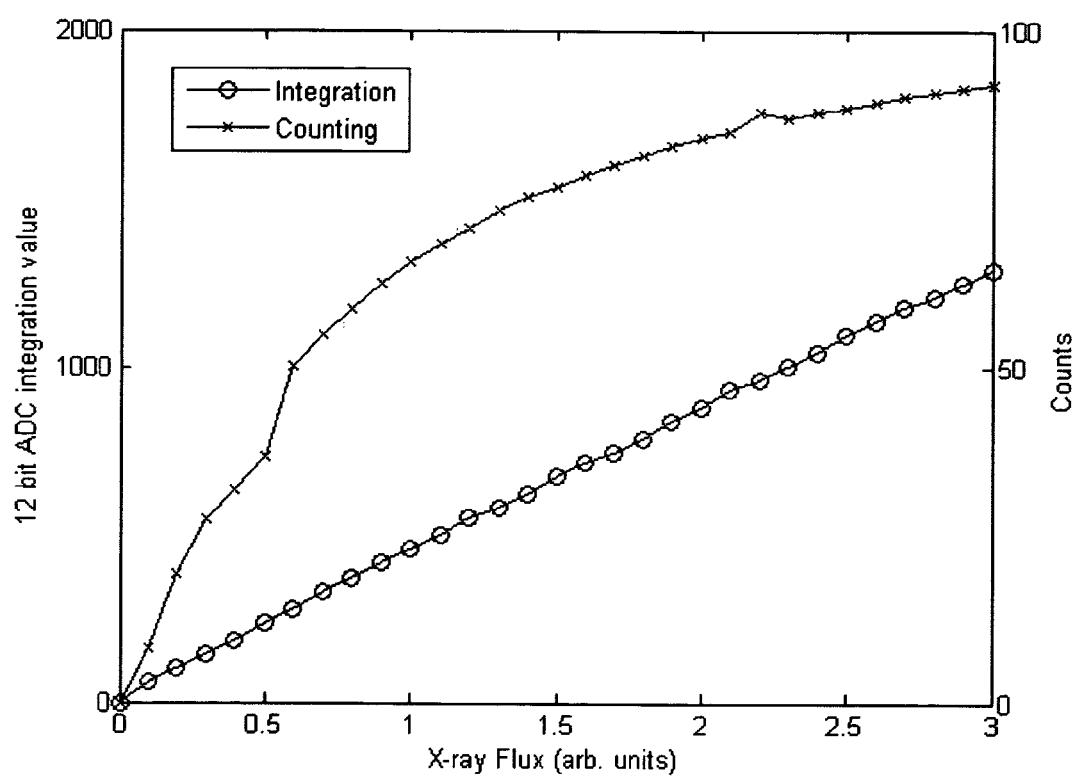
FIG. 12A is a graphical plot of the output of a detector system processed in photon counting or integrating modes.
Figure 12B:
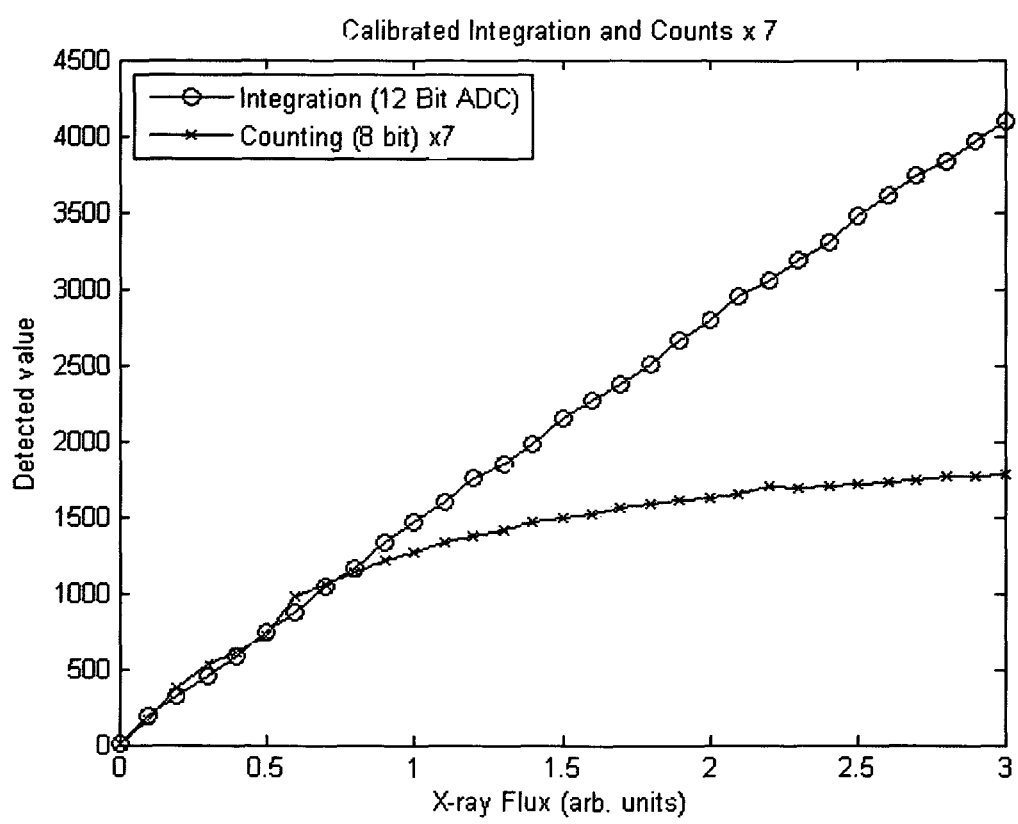
FIG. 12B is a graphical plot in which the photon counting data of FIG. 12A are rescaled.

A test example of the individual response of photon counting and integrating modes is provided by FIG. 12A, which shows plots of experimental data acquired in both modes as a function of incident X-ray flux. Photon counting mode shows a downward departure from linearity as flux increases due to pulse pileup. In the same range, integrating mode provides a substantially linear response. Applying a scaling factor to the photon counting data of FIG. 12A brings the two data sets into substantial agreement for lower flux values, as shown in FIG. 12B. However, the problem of pulse pileup still compromises the counting mode data for higher flux values.

Figure 13:
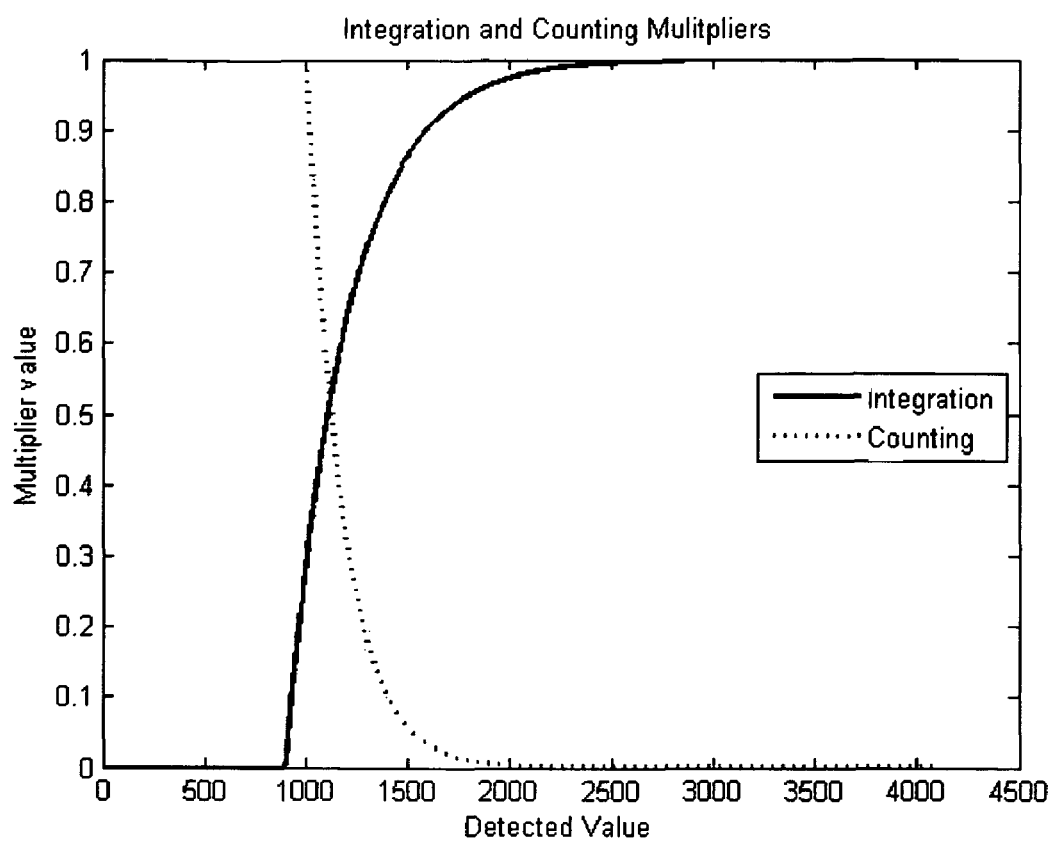
FIG. 13 is a graphical plot of multiplier factors used in connection with soft-switching incorporated in some embodiments of the invention.
Figure 14:
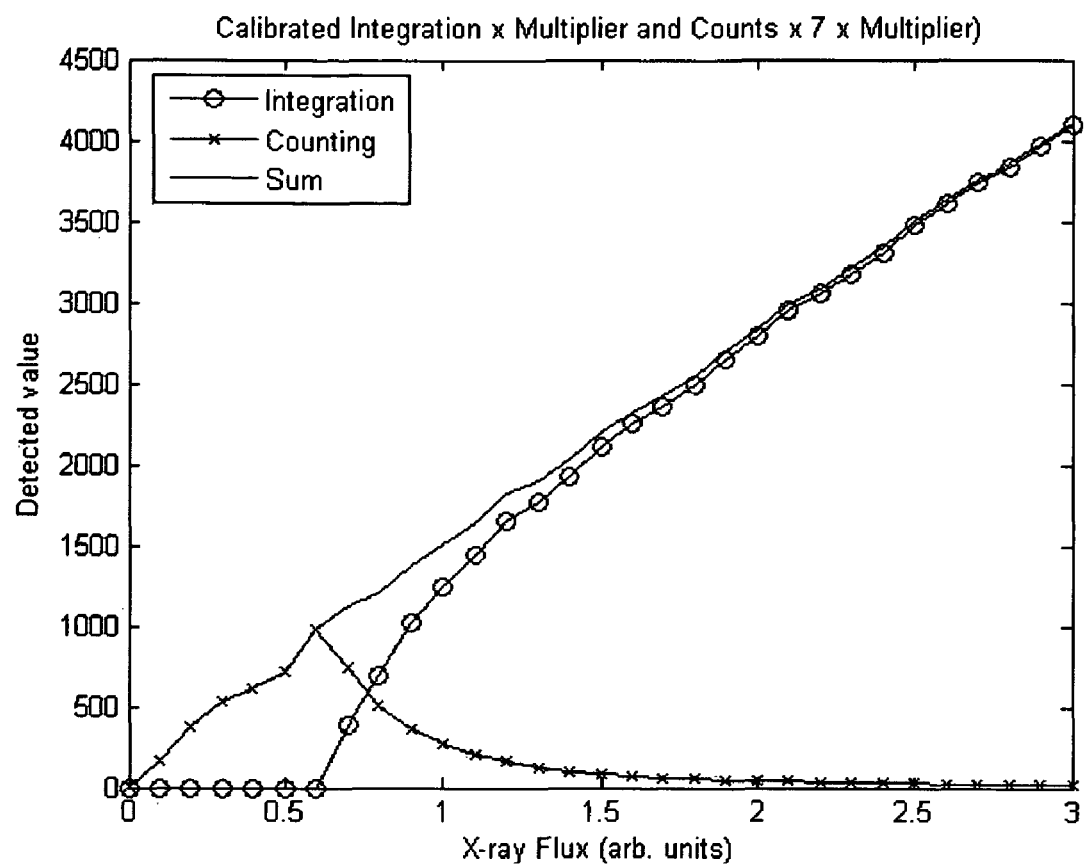
FIG. 14 is a graphical plot of the data of FIG. 12A showing the effects of scaling and the multiplier factors of FIG. 13.

In one possible implementation of combining the data modes using soft switching, switching multipliers are applied to the raw data from each mode. Representative multipliers are depicted in FIG. 13, such that at low flux values, the net result is determined purely by the counting data, while at high flux values, only the integrating mode data are used. In a transition region, which may be specified based on the output of either or both of the counting and the integrating mode channel, a combination of the data is used. FIG. 14 depicts the counting mode and integrating mode data of FIG. 12B after multiplication by the respective switching multipliers of FIG. 13, along with the sum of the multiplied data sets. The resulting combined data show a generally smooth and linear dataset. Although not specifically shown, the combined data at low flux values does not exhibit the effect of electronic noise inherent in the integrating mode data, the only appreciable noise arising from Poisson counting statistics, which affect both modes. Other weighting schemes are possible, such as by having the counting and integration weighting factor be a function of either the count value or the integration value or both.

The present system preferably employs a gating system, in which the output display is inhibited from scrolling the image across the screen, when no item is present in the inspection zone. The passage of an item into the inspection zone also might be sensed by mechanical means, such as a lever actuating a mechanical switch or a load sensor, or an optoelectronic system involving the interruption of a light beam.

Typically, an operator would activate the system, causing the X-ray generating system to produce radiation and the conveyor belt to begin to move. Thereafter, the X-rays remain on and the detection system is constantly monitoring the incoming data to determine if an object is present. The system divides the X-ray beam scan line into pixels and performs initial processing on the detected transmission signal, such as subtracting out any offset and normalizing the value assigned to each of the pixels of the scan line. Other filtering and image processing may also be carried out. The signal processing software thereafter determines if there is sufficient attenuation in these pixels to signal the presence of matter that needs to be interrogated. In an implementation, the software interrogates data in each new scan line, sequentially comparing each pixel to a preselected level of X-ray attenuation. If a pixel is attenuated beyond the preselected level, a counter is incremented; otherwise the counter is decreased, by subtracting either a constant or a fraction, e.g. a division by 4, with the proviso that the counter is not allowed to go negative. If at any time the counter exceeds a preselected trigger value, scrolling (image acquisition) will start. If the line is completely processed and the counter never exceeds the preselected trigger value, scrolling stops. This algorithm gives the pixels with low attenuation more weight than the pixels attenuated beyond the preselected level, thereby preventing scrolling on a small number of dark pixels created by noise.

The scroll signal can be filtered such that the response to a transition from a scroll start to a scroll stop signal will continue scrolling for at least a set number of lines. In this way scrolling will not be interrupted inadvertently in the middle of an object due to a small number of lines falling under the scroll threshold.

In an alternative implementation, the above process can be accomplished using the backscatter signal so that scrolling would only start on objects with a stronger backscatter signal. This would be accomplished in the same way except the counter would be increased when the backscatter signal exceeds a preset level and decreased when the backscatter signal is less than the preset level.

Both transmission and backscatter could be used together in still another implementation, so that scrolling will occur if an object is detected by either the transmission and/or the backscatter scrolling algorithms. This would be useful to detect objects that have very little attenuation of X-rays but have a larger backscatter signal, such as very thin sheet explosives.

Blank lines optionally can be inserted before scrolling starts and after scrolling stops to make the image easier to view.

Figure 15:
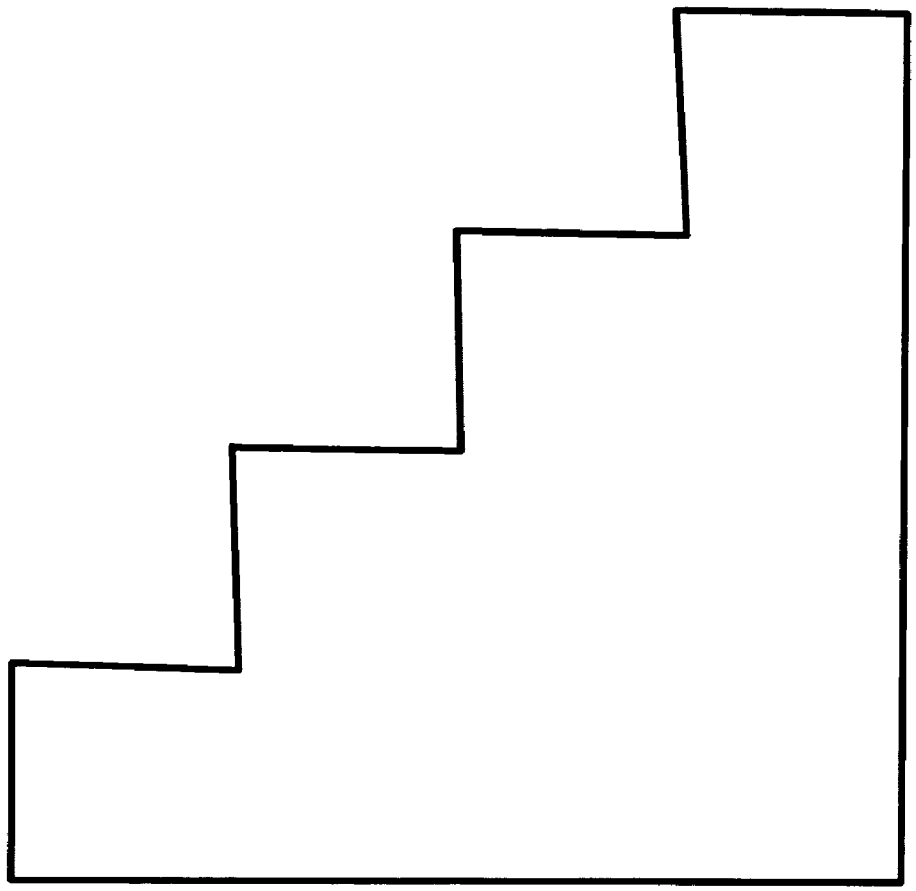
FIG. 15 depicts in side plan view a prototypical step wedge used in calibration of the present system.

The availability of both backscatter and transmission data for the X-ray beam path for each pixel of the images permits a determination of an approximate effective atomic number $Z_{eff}$ for the material in each pixel path. The value of $Z_{eff}$ for a given path may be determined using the following empirical calibration procedure, based on data collected by scanning fiducial step wedges of certain materials. By a "step wedge" is meant a test block composed of a preselected material having a series of incremental thicknesses. FIG. 15 generally depicts a side view of a step wedge having four different thicknesses. It will be understood that step wedges used for the present calibration procedure ordinarily will use a much larger number of thicknesses. A beam of X-rays is passed through the wedge in a generally horizontal direction. Transmission and scatter intensities are determined for beam paths intercepting each of the step thicknesses, thereby characterizing the thickness-dependence of both intensities for a material having the $Z_{eff}$ value characteristic of the selected material. The same test is repeated using several materials with different known atomic numbers. For example, step wedges composed of Lucite, aluminum, and iron or steel may be used to span the range of Z values of interest from organics (like common explosives, incendiaries, and drugs) to the metals used in common handguns. A two-dimensional lookup table is formed, the dimensions being specified by the ranges of intensity from minimum to maximum in transmission and backscatter, respectively. These maxima and minima are ordinarily determined experimentally using highly absorbing and backscattering calibration samples and an open system. The step wedge experiments yield empirical transmission and backscatter intensities for certain known Z values and thicknesses. The remainder of the lookup table is completed using known interpolation and extrapolation techniques, so that an approximate $Z_{eff}$ value is uniquely provided for each possible combination of backscatter and transmission intensity. It is found that the lookup table is a mapping that combines the two intensities in a non-linear manner. It will be understood that the same approach can be used to determine a $Z_{eff}$ value using a system that employs transmission and forward scatter detection. A system providing transmission detection and both forward and backscatter detection can also be used to collect step-wedge data, from which a $Z_{eff}$ mapping can be established.

It is also possible to determine $Z_{eff}$ of an object by only using a single transmission detector's integrating and counting signals. Such an approach is an alternative to dual-energy systems that rely on either multiple transmission detectors sensitive to different energies or transmission detectors that directly provide energy discrimination. The integration signal is representative of the total X-ray energy that is transmitted through the object, whereas the counting signal is representative of the total number of X-rays that have transmitted through the object. Since the input X-ray spectrum is broad, one can see that dividing the integration signal by the counting signal would give a result of the average X-ray energy that transmitted through the object. Since different $Z_{eff}$ materials will affect the input X-ray spectrum in different ways, the resulting average X-ray energy will be a characteristic of the object material. Using measurements of the X-ray interaction with different step wedges in a manner similar to that described above for calibration using information derived from both transmission and scatter detectors, an alternative mapping of $Z_{eff}$ can be based on integration and counting signals from just the transmission detector. In still another implementation, a combination of integration and counting signals from the transmission detector and scatter signals from the scatter detector can be used to produce a mapping of $Z_{eff}$. It should be noted that when using the transmission signals alone, the order in which different materials are layered within an object will not affect the $Z_{eff}$ outcome. However, when using either forward scatter or backscatter signals in combination with other signals to determine $Z_{eff}$ the outcome may be affected by the ordering of the different materials in the object. By comparing the results of the different methods for determining $Z_{eff}$ it is possible to obtain some indication how the components are ordered in the object or to locate low-Z objects that are shielded from a backscatter detector. An operator can be alerted in response, permitting suspicious objects to be subjected to physical inspection or other forms of testing.

For example, a substantial amount of organic contraband such as drugs or explosives can be obscured from the scatter detector by an intervening high-Z material. The intervening high-Z material does two things: 1) it reduces the X-ray flux that is available to scatter off of the contraband, and 2) it attenuates X-rays that do scatter from the low-Z material towards the scatter detector. Thus, the presence of the intervening high-Z material acts to greatly reduce the contrast of the contraband when compared to the case in which low-Z contraband is intervening between the scatter detector and the high-Z material.

Figure 18:
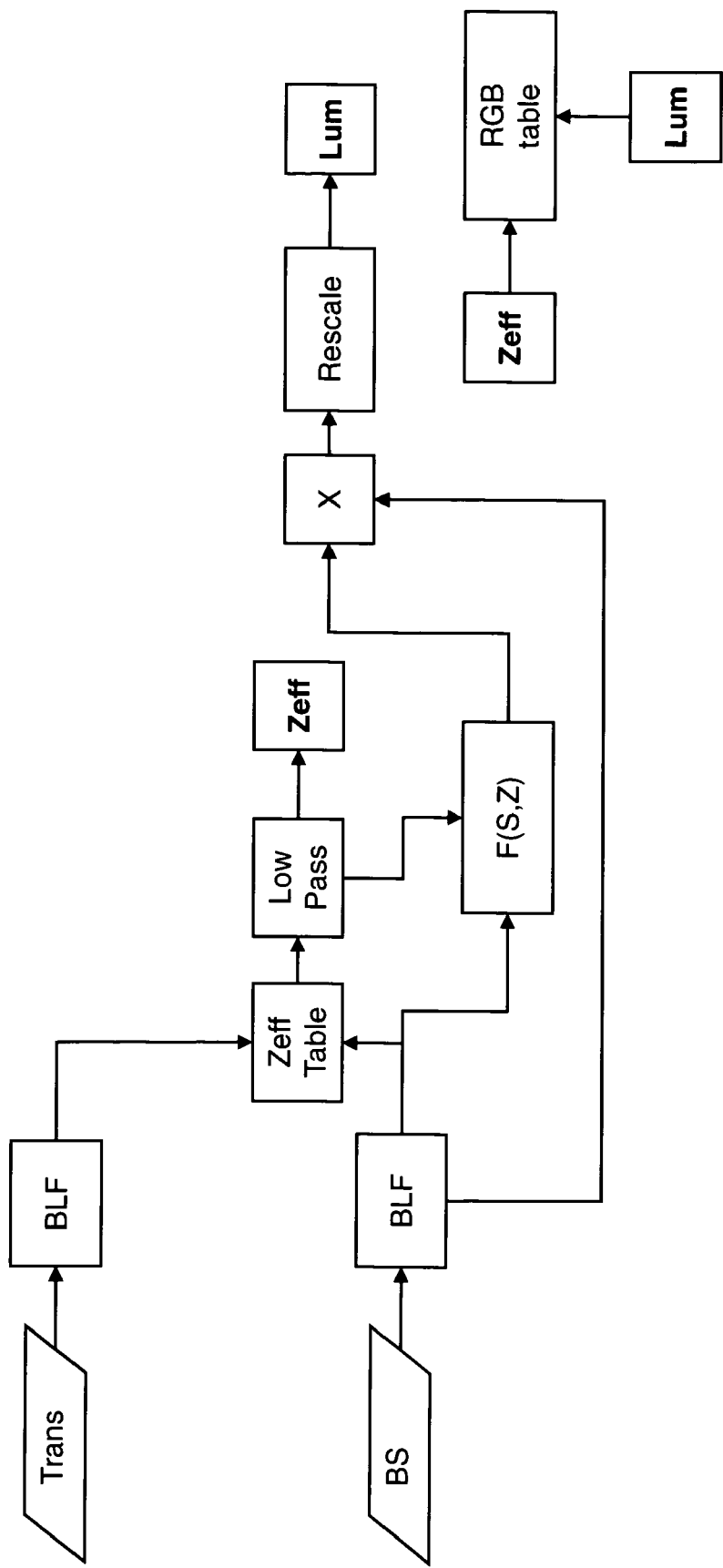
FIG. 18 depicts a flow diagram of data processing providing a form of contrast enhancement in an operating mode of the present system.

In an aspect, the invention provides methods of enhancing the contrast or visibility in the case where the high-Z material is intervening between the scatter detector and organic material by way of image processing algorithms. One such method modifies the scatter signal intensity on a pixel by pixel basis by a function F(Z,S) of the pixel's $Z_{eff}$ value and the scatter signal intensity. The modification is biased to have the greatest effect when the $Z_{eff}$ value indicates the presence of a high-Z material, such as steel, and when the scatter signal is greater than expected for a pure high-Z material in the beam path. One possible function is given formally by the equation $F(S,Z)=A*[exp(B*Z^C*S-1)-exp(-1)]^D+1$, wherein A, B, C, and D are numerical constants. The function F(Z,S) could also be implemented using an empirically determined lookup table instead of an analytic form. An image processing data flow that implements this method is shown in FIG. 18.

Figure 19:
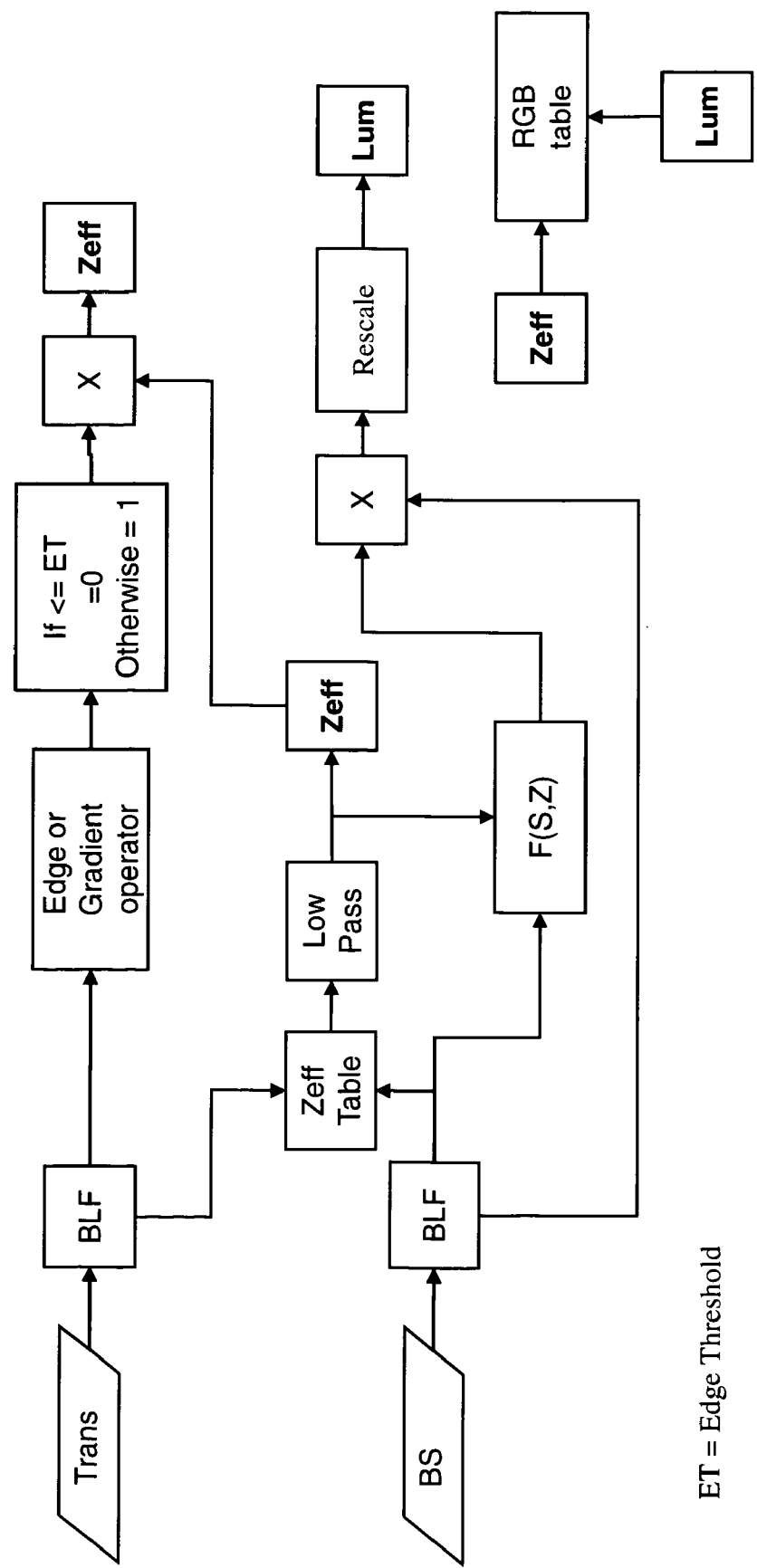
FIGS. 19 and 20 depict flow diagrams of data processing providing forms of contrast and edge enhancement in alternative operating modes of the present system.
Figure 20:
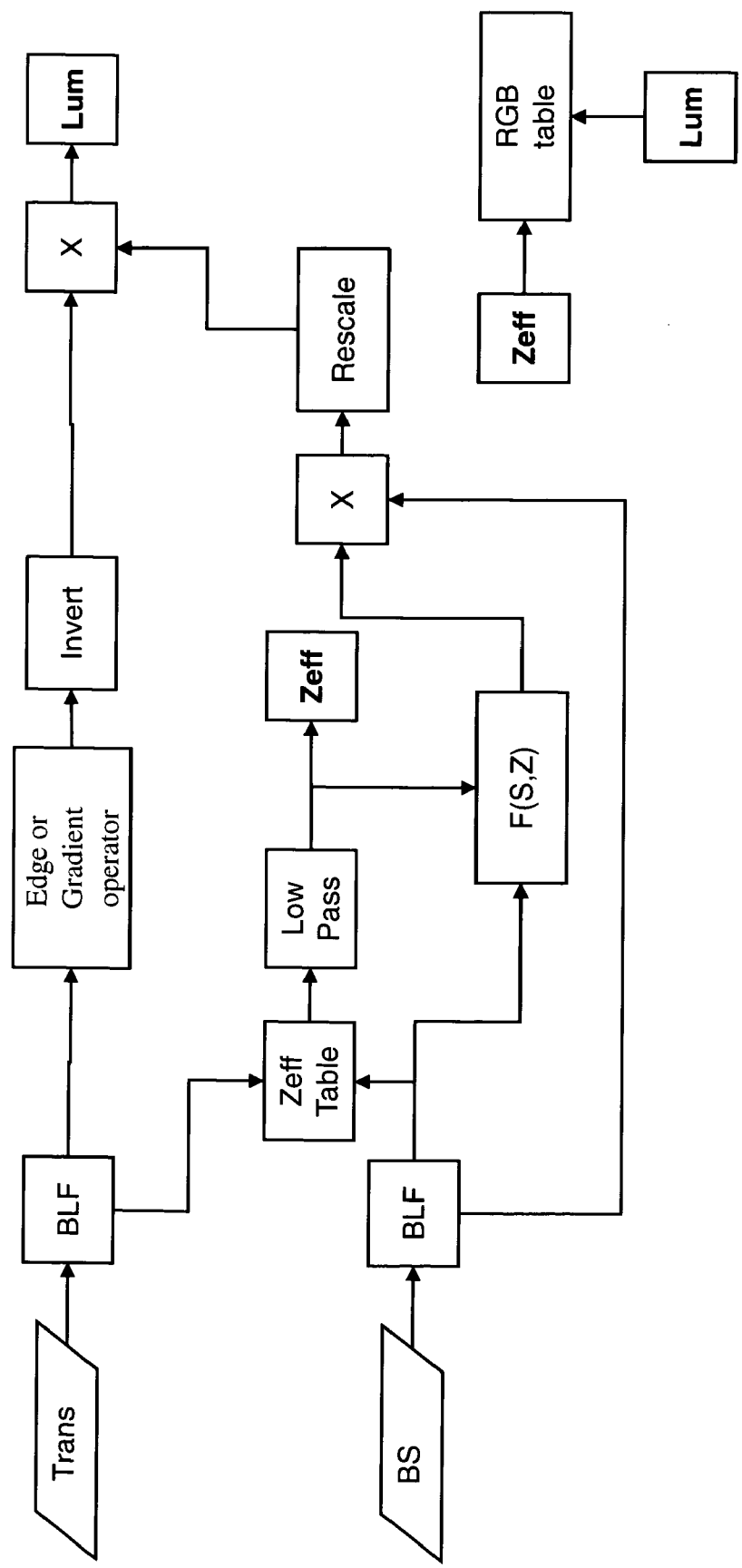

FIGS. 19 and 20 depict alternate processing algorithms that further include edge enhancements, based on algorithms that identify rapid spatial variations in the detected signal usually indicative of an edge of some item in the object being scanned. In some embodiments, the enhancements may also involve the identification of regions predominated by a particular range of $Z_{eff}$ values. These regions are optionally highlighted by including in one or both of the scatter and transmission images an outlining of the identified regions, preferably done in a color reflective of the $Z_{eff}$ predominant in that region. Other functions can be used that may include combinations of, but not limited to transmission counting and or integrating signals, scatter counting and or integrating signals, and alternate methods of determining $Z_{eff}$.

The present enhancement algorithms can further include convolution methods that take account of the data recorded in additional pixels neighboring the pixel being modified. The elements of the convolution kernel could include functions of: the distance from the pixel being modified, transmission intensity of the kernel element pixel, scatter intensity of the kernel element pixel and the differences between intensities of the pixel being modified and that of the kernel element pixel. It is understood that combinations of the above can also be made to produce the convolution kernel elements and that some of these combinations would result in the kernel element being dependent on $Z_{eff}$.

Figure 21:
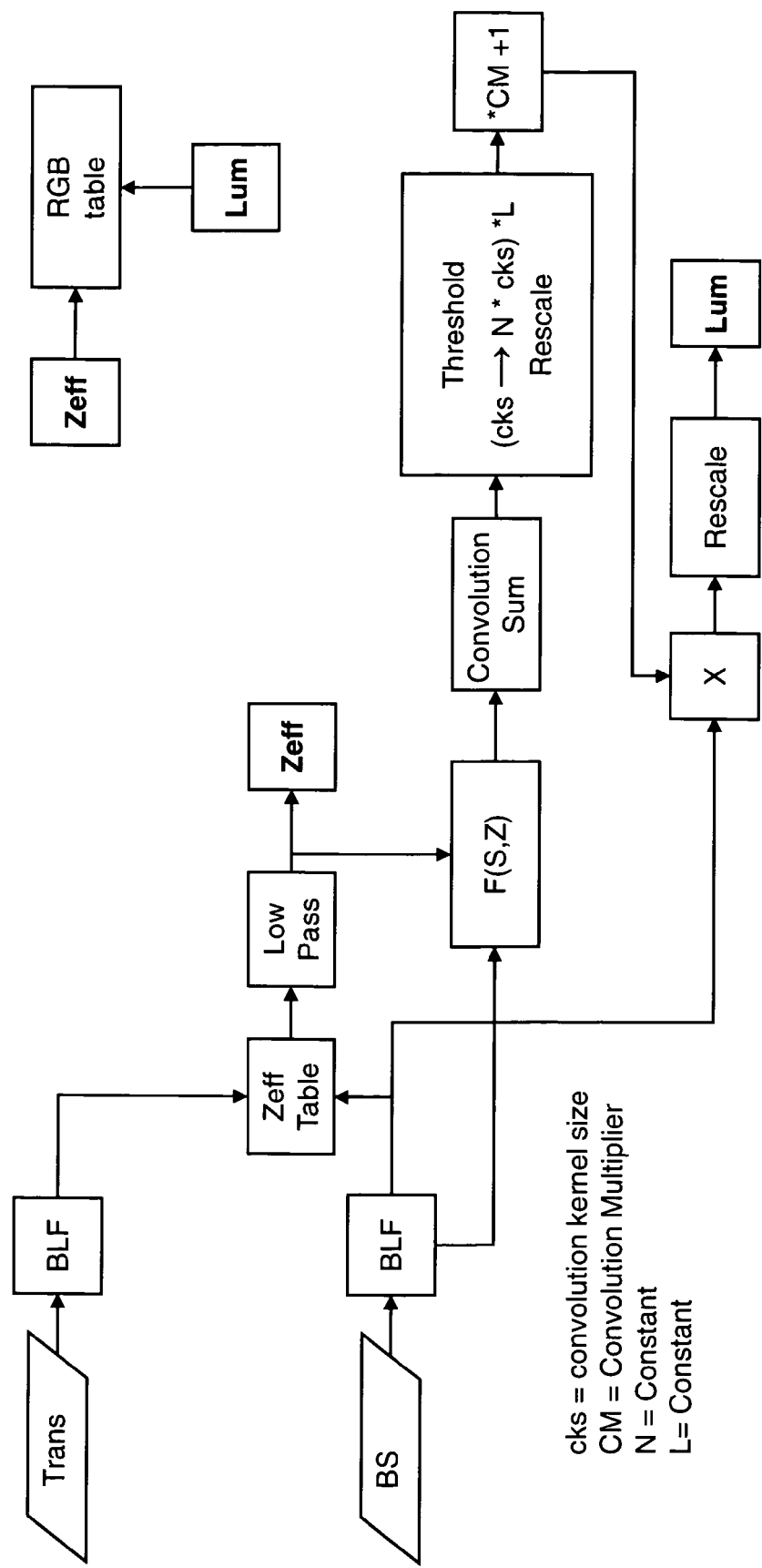
FIG. 21 depicts a flow diagram of data processing providing a form of contrast enhancement involving convolution used in an operating mode of the present system.

FIG. 21 illustrates one possible use of a convolution to further enhance the signal of a low-Z material shielded by a high-Z material. Passing the data through the shielded low-Z enhancement function F(S,Z) produces an output that has a value of 1 (resulting in no modification) for pixels that do not meet the criteria of a shielded low-Z material and a value>1 for a pixel that does meet the criteria. This result is subjected to a convolution operation that sums all the values in the kernel of size cks. Resultant pixels that have a value at or near cks would not be considered shielded low-Z material pixels, so cks would be set a lower threshold for resealing (0 to 1) and N×cks would set the upper threshold for rescaling wherein N is some positive number. After rescaling the result can optionally be multiplied by CM to further enhance the contrast between pixels. 1 is then added to the pixels so that when multiplied by the filtered backscatter pixels, those pixels that are considered not be shielded low-Z material are multiplied by one so that they stay the same. Other resultant pixels from the convolution, thresholding, rescaling, multiplying and addition of 1 have values greater than one and will increase the filtered backscatter pixels' values when multiplied. These multiplied backscatter pixels are then rescaled again for the proper dynamic range for input to the RGB table.

In a preferred implementation, the system constructs a pixelated, colorized combination image for display. Either or both of the scatter and transmission images may be so colorized. Each pixel of the combination image is displayed in a manner that may be described by a color descriptor that specifies the appearance of that pixel on the display device. One commonly used color descriptor is an RGB value, i.e., a set of three numbers corresponding to the intensity of the primary colors red, green, and blue. Typically, a display device such as a color computer monitor may have a signal input specified by input voltages on three lines, each of the values corresponding one of the RGB numbers. In an implementation of the present method and system, the RGB value associated with each displayed pixel is returned from a predetermined 2-D lookup table that has $Z_{eff}$ and Luminosity as its inputs. The RGB values in the lookup table are originally constructed based on the hue-saturation-value (HSV) color system. (The HSV system provides another recognized form of color descriptor. It will be understood that the alternative color systems and the corresponding color descriptors may be used to carry out these functions.) For the colorization of the images of the present system, the hue in the HSV representation is determined by a continuous, one-to-one mapping that associates a hue with every possible $Z_{eff}$ value in the lookup table. The value is determined by either a single detector signal or a combination of detector signals, while the saturation is selected as a function of both $Z_{eff}$ and the luminosity. All the resulting combinations of hue, saturation and value are then converted in a conventional manner to RGB values that form the entries in the 2-D lookup table, which specifies a particular colorization for each possible input. For actual operation of the system, the $Z_{eff}$ input to the RGB table for each pixel is obtained from one of the procedures described herein and the luminosity input could be derived from either the transmission signal, scatter signal, or a combination of signals. The image processing may also include contrast enhancement either of the whole range of the display, or enhancement within a particular portion of the overall range of hue and/or luminosity. The images herein may also be displayed monochromatically, optionally with similar contrast adjustments. The ability for an operator to zoom any of the displayed images electronically, to magnify certain regions for additional scrutiny, may be provided.

The $Z_{eff}$ determination is used in other optional display features and enhancements in the present system. For example, certain regions of the backscatter- or transmission-based images may be automatically identified by virtue of some combination of $Z_{eff}$, area, shape, and X-ray intensity. Such regions may be specially indicated on the display, e.g. by highlighting, colorization, or outlining on the display with a bounding curve, such as an ellipse, circle, or rectangle. Such emphasis is intended to draw the operator's attention to features that warrant extra scrutiny of the image or physical inspection of the article itself. For example, a highly absorbing region of sufficient size might indicate the presence of a metal weapon or an absorbent shield used to hide some other contraband. A large area giving rise to high backscatter might indicate the presence of explosive material. The alert may also be triggered by the inferred total mass of the object, as indicated by a predetermined combination of the foregoing factors including information derived from one or both of the transmission and backscatter intensities, or by criteria that further take account of particular values or ranges of $Z_{eff}$. Optionally, an automatically-determined edge of such a region identified in accordance with one or more of the foregoing criteria might be automatically intensified, colorized, or otherwise highlighted. Any of the foregoing display emphases may be applied to one or more images on the display and done to either colorized or monochrome displays, with or without other enhancements.

In some implementations $Z_{eff}$ may also be used to blank certain areas of the display, to focus an operator's attention on other suspicious areas. Blanking, stripping, or uniform colorization may be done to remove areas dominated by either high Z or low Z materials.

The present system optionally incorporates signal processing to minimize artifacts resulting from cosmic rays striking the scintillation detectors. The relatively large size of the scintillation medium of the detectors used in the present system, especially the backscatter detectors, can lead to spurious counts from cosmic rays.

Cosmic ray interactions can deposit very large amounts of energy in the scintillator, thereby creating very large signals that can saturate or overload the PMT and/or the detector electronics. Cosmic ray events in the scatter image may appear as white dots in the dark background (low scatter region) and as white dots in parts of the transmission image that have attenuating objects, making a dark background for the white cosmic ray pixel. Additionally the signal from the cosmic rays can be so big that the PMT-electronics combination cannot recover in a signal pixel time so that the adverse effects from the cosmic ray can spill over into multiple pixels.

It is desirable to eliminate these extraneous cosmic ray events from the image data before applying signal processing methods to at least one of the scatter and transmission images so that they do not adversely skew the results and reduce image quality. In some implementations cosmic ray events are detected by monitoring the signal from the detector system or the PMT output. Any pixel in which the signal exceeds a preselected threshold is marked for modification. It is preferable that several adjacent pixels, usually 3 to 4, also be marked to account for the likelihood that the recovery time of the PMT detector system after a given cosmic ray event affects more than just a single pixel.

Possible techniques for modifying pixels to remove the cosmic ray artifact include:

1. Replacement—with this method the pixel value previous to the cosmic ray event replaces the value for the cosmic ray pixels. This method is readily implemented, but tends to result in minor image artifacts. Replacement of n pixels gives the n+1 pixel the same value, which may appear as stripping in the image.

2. 1-d interpolation—in this method the pixel replacement is accomplished by interpolation between the pixel value before the cosmic ray event and the pixel value after the cosmic ray event has subsided.

3. 2-d interpolation—this method requires the use of scan lines before and after the scan line in which the cosmic ray event occurred. It is similar to the 1-d interpolation method except it uses adjacent scan lines so that a 2-d interpolation can be performed.

Some embodiments of the present system employ signal filtering techniques to improve the quality and appearance of pixelated visual representations based on the transmission and scattered data sets. Ideally, filtering would remove noise from an image without loss or degradation of the appearance of any features. Additionally, an ideal filtering process could be carried out rapidly enough to be compatible with real-time display of images in a scanning system. Conventional low passing image processing techniques are sufficiently rapid and reduce the noise, but at the same time undesirably degrade the spatial resolution of the image.

Some preferred filtering implementations employ bilateral filtering (BLF) of one or more of the data sets. As used herein, the term "bilateral filtering" refers to an averaging process in which the value of each pixel is corrected using a weighted average of the unfiltered value of the given pixel and the unfiltered values of a plurality of nearby pixels, with higher weighting being given to pixels that are closer in both space and intensity to the given pixel. Bilateral filtering beneficially results in less image degradation than conventionally used low pass filtering methods. For example, edges of objects are better preserved in a bilaterally filtered image.

The present system may be implemented using any form of BLF. In the most general form, a convolution kernel is calculated for each pixel to accord with the chosen weighting parameters based on the pixels' intensity and location. For example, the BLF calculations may use Gaussian profiles for both the spatial and intensity weight distributions. Other distribution profiles are also possible. In general, BLF beneficially minimizes loss of edges and spatial features in the image, while at the same time denoising the image, by use of the combined spatial and intensity dependent weight factors in the convolution kernel. Thus, in the BLF filtering computation for a given pixel, low weight will be given to any nearby pixel that has a very different intensity. It is desirable to set the width of the intensity profile to include typical image noise so that those pixels factor into the convolution strongly, thereby averaging out the noise, while pixels outside the range of the image noise would be considered an image feature and will only factor in weakly to the convolution, to help preserve the feature or edge.

Implementations of the most general BLF form nominally involve a 2-dimensional M×M convolution kernel operating on an N×N image, so the number of operations is proportional to $M^2 \times N^2$. It is possible to approximate the 2-dimensional BLF operation by a separable form of BLF. This form involves two 1-dimensional filtering operations, so the total number of operations required is proportional to $M \times N^2$, which is substantially less then $M^2 \times N^2$ for large images.

It is also possible to make the intensity profile kernel adaptable to the image signal to noise ratio (S/N), which is known to be proportional to the square root of the number of X-rays in the pixel. Accordingly, the intensity profile width can be made proportional to the square root of the pixel value.

The present system also includes other optional forms of contrast enhancement, that may be applied to some or all of the displayed images. For example, areas of the image may be selected for enhancement as being predominantly in a preselected $Z_{eff}$ range. In one implementation, known methods of tone-mapping can be applied based on a comparison of a bilaterally-filtered image and the un-filtered image. Re-using the filtered image in this manner allows for a localized contrast enhancement that is computationally efficient, allowing it to be performed in real-time. The resulting image further complements the filtered image well, since it restores and enhances details that were attenuated by the filtering, as well as other details and features. The signal processing may include corrections of distortion arising from the beam sweeping geometry.

Edge enhancement is particularly beneficial for the backscatter display in certain embodiments of the invention. In general, the lower intensity of the backscatter signal tends to reduce the clarity of the backscatter image. Suitable edge enhancement thus permits an operator to discern images that might otherwise not be as readily apparent.

Figure 16:
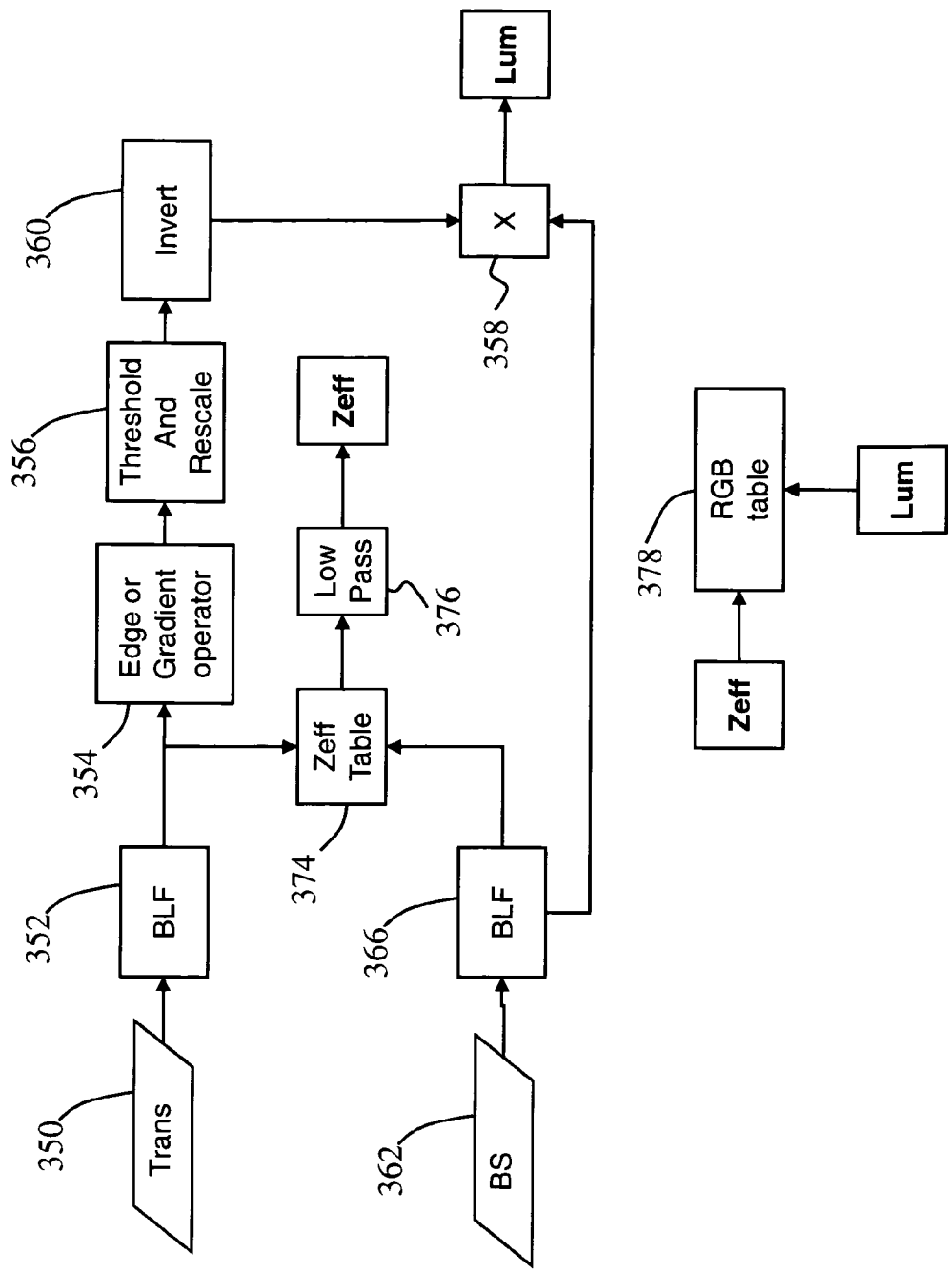
FIG. 16 depicts a flow diagram of data processing providing edge enhancement in an operating mode of the present system.

One possible embodiment provides a backscatter display with edge enhancement effected using the process schematically depicted by FIG. 16. Raw data from transmission and backscatter detectors are suitably calibrated (e.g., by including offset and scaling corrections if needed) to provide transmission data 350 and backscatter data 362. Further filtering, such as a bilateral filtering 352 of the type described above, is applied to transmission data 350.

Backscatter data 362 are optionally passed through bilateral filter 366. Filtered transmission data 352 and backscatter data 366 are then combined to determine $Z_{eff}$, such as by using a non-linear table lookup process 374 described in greater detail above. The combined data are passed through a low-pass filter 376 to provide a pixel-by-pixel function $Z_{eff}(S,T)$, in which S and T respectively represent the values of the scatter and transmission intensity after the foregoing processing. The function $Z_{eff}(S,T)$ specifies hue in a colorized backscatter display.

Additional pathways are used to provide edge enhancement that is applied to the backscatter data for display. It is preferred that edge enhancement be derived from the transmission image, which ordinarily has higher resolution than the backscatter image. In addition the scatter image is typically noisy, which will produce artifacts when edge filtered. Edge filtering 354, as described in greater detail below, is applied to filtered transmission data 352 to better define features in the transmission image. For practical reasons, the transmission data may then be multiplied by a preselected scaling factor, which may be 2, and thresholded 356 to a preselected bit limit, such as 10 bits (i.e., between 0 and 1023), and then rescaled and inverted 360. Rescaling acts to provide edge pixels with values close to 1 and background pixels close to 0. Inversion 360 results in edges that are black or nearly so (values close to 0) and background that is light (values close to 1). The resulting data thus exhibit an enhancement or accentuation of edge features.

Other implementations of edge enhancement will be known to those skilled in the image processing art and may be used in embodiments of the present system.

Edge filtering 354 may be carried out in any suitable manner. One possible implementation is described by the computer code set forth in FIG. 17. For each pixel, a convolution is carried out involving unfiltered input data at horizontally and vertically adjacent pixel locations, as specified by the unfiltered input array "dataIn." In the last line of the code, an average deviation "c" is used to exponentially weight each pixel in the filtered input data array "imageAvg" to produce an edge-enhanced output array "dataOut." The use of the exponentiation operation emphasizes relatively strong, well-defined edges and de-emphasizes noisy or weak edges. When the pixels in the "dataOut" array are multiplied with their counterparts in filtered backscatter data 366, e.g. as shown in FIG. 16, the result provides enhancement of the edges of features in the backscatter data, thereby permitting the operator to use the combined colorization and edge enhancement to carry out the identification of contraband items in the object being scanned with greater efficiency and accuracy.

Having thus described the invention in rather full detail, it will be understood that such detail need not be strictly adhered to, but that additional changes and modifications may suggest themselves to one skilled in the art, all falling within the scope of the invention as defined by the subjoined.

We claim:

1. A scanning X-ray inspection system for scanning an object and displaying pixelated images of its contents, comprising:
    a) an X-ray generation device for generating a flying-spot pencil beam of X-rays repetitively sweeping along a straight line in a scanning direction across said object;
    b) transport means for moving said object through an inspection zone of said system in a transport direction substantially perpendicular said scanning direction;
    c) a scatter detector for generating a scatter signal represented by a scatter signal array comprising scatter pixels, each representative of the intensity of X-rays scattered from a particular region of said object;
    d) a transmission detector for generating a transmission signal represented by a transmission signal array comprising transmission pixels, each corresponding to one of said scatter pixels and representative of the intensity of X-rays in said pencil beam transmitted through said particular region of said object and undeviated in direction;
    e) a read-write memory for storing said scatter signal array and said transmission signal array;
    f) a processor for processing said scatter and transmission signal arrays to associate with each said pixel a value of effective atomic number $Z_{eff}$; and
    g) a display for displaying a scatter image comprising scatter display pixels corresponding to said scatter pixels and a transmission image comprising transmission display pixels corresponding to said transmission pixels, and wherein:
        at least one of said scatter image and said transmission image is colorized, each pixel of said colorized image being displayed in accordance with a color descriptor derived from said $Z_{eff}$ value corresponding to said pixel, and
        each said $Z_{eff}$ value is determined in accordance with a preselected mapping that uniquely specifies said $Z_{eff}$ value for values of said scatter pixel and said transmission pixel.

2. A system as recited by claim 1, wherein both said transmission and scatter images are colorized, each pixel of both said colorized images being displayed in accordance with a color descriptor derived from said $Z_{eff}$ value corresponding to said pixel.

3. A system as recited by claim 1, wherein said scatter detector is a forward scatter detector.

4. A system as recited by claim 1, wherein said scatter detector is a backscatter detector.

5. A system as recited by claim 1, wherein said X-ray generation device comprises a fixed slit collimator and a rotating collimator having a plurality of slits of substantially equal size.

6. A system as recited by claim 1, wherein said X-ray generation device comprises a fixed slit collimator and a rotating collimator having a plurality of slits, said slits being of two substantially different sizes.

7. A system as recited by claim 1, whereby said transmission detector comprises a scintillator having a short persistence phosphor and at least one photon detector.

8. A system as by claim 5, wherein said short persistence phosphor is either $Gd_2SiO_5$ or $Y_2SiO_5$.

9. A system as recited by claim 1, wherein said transmission detector comprises an organic plastic scintillator and at least one photon detector.

10. A system as recited by claim 1, wherein said transmission detector comprises a shielded housing configured to admit radiation in said scanning pencil beam transmitted through said object being scanned while preventing escape of radiation scattered from within said transmission detector.

11. A system as recited by claim 1, wherein said transmission detector comprises vanes configured to admit transmitted and scattered radiation emanating from the object being inspected while preventing re-emission of radiation that is scattered from within said transmission detector.

12. A system as recited by claim 1, wherein said scatter detector comprises a scintillator having a short persistence phosphor and at least one photon detector.

13. A system as recited by claim 12, wherein said short persistence phosphor is either $Gd_2SiO_5$ or $Y_2SiO_5$.

14. A system as recited by claim 1, wherein said scatter detector comprises an organic plastic scintillator and at least one photon detector.

15. A system as recited by claim 1, wherein a substantial portion of at least one of said scatter detector and said transmission detector is enclosed in a short persistence, high Z phosphor.

16. A system as recited by claim 1, wherein a substantial portion of at least one of said transmission detector and said scatter detector is wrapped with an optically reflective material.

17. A system as recited by claim 1, wherein at least one of said transmission detector and said scatter detector comprises a wavelength shifting scintillator material.

18. A system as recited by claim 1, wherein at least one of said transmission detector and said scatter detector comprises an organic plastic scintillator and a wavelength shifting scintillator optically coupled thereto.

19. A system as recited by claim 1, wherein at least one of said scatter and transmission signals is a combination signal processed using a photon counting mode and an integrating mode simultaneously.

20. A system as recited by claim 19, wherein said combination signal is processed using soft switching between said photon counting mode and said integrating mode.

21. A system as recited by claim 1, configured such that a bilateral filtering is applied to at least one of the scatter signal array and the transmission signal array as part of the processing of said at least one signal array.

22. A system as recited by claim 19, wherein said bilateral filtering is applied to both of said scatter signal array and said transmission signal array as part of the processing of said signal arrays.

23. A system as recited by claim 1, configured to apply a cosmic ray filtering to at least one of said scatter display pixels and said transmission display pixels to remove spurious effects of cosmic rays impinging said transmission and scatter detectors.

24. A system as recited by claim 1, wherein said transport means comprises a conveyor belt and said scanning direction is horizontal.

25. A system as recited by claim 1, wherein said transport means comprises a conveyor and said scanning direction is vertical.

26. A system as recited by claim 1, wherein said transport means comprises a conveyor moving at a belt speed and a conveyor speed control system operable to adjust said belt speed (i) to allow rapid entrance of said object into said inspection zone, (ii) slow traverse through said inspection zone to prolong residence therein of said object, and (iii) thereafter allow rapid exit of said object from said inspection zone.

27. A system as recited by claim 1, wherein said scatter image and said transmission image are scrolled across said display in concert with said motion of said object through said inspection zone, and said system comprising a gating system configured to inhibit said scrolling when no item is present in said inspection zone.

28. A system as recited by claim 1, wherein said transmission detector comprises a plurality of transmission detector segments, and during said sweeping, said pencil beam sequentially illuminates said transmission detector segments, and one or more of said transmission detector segments are used to detect scattered radiation during portions of said sweeping in which said one or more segments are not being illuminated by said pencil beam.

29. A scanning X-ray inspection system for scanning an object and displaying pixelated images of its contents, comprising:
  a) an X-ray generation device for generating a flying-spot pencil beam of X-rays repetitively sweeping along a straight line in a scanning direction across said object;
  b) transport means for moving said object through an inspection zone of said system in a transport direction substantially perpendicular said scanning direction;
  c) a scatter detector for generating a scatter signal represented by a scatter signal array comprising scatter pixels, each representative of the intensity of X-rays scattered from a particular region of said object;
  d) a transmission detector for generating a transmission signal processed simultaneously using a photon counting mode and an integrating mode and represented by a transmission signal array comprising transmission pixels including counting-mode pixels and integrating-mode pixels, each counting-mode pixel and each integrating-mode pixel corresponding to one of said scatter pixels and representative of the intensity of X-rays in said pencil beam transmitted said particular region of said object and undeviated in direction;
  e) a read-write memory for storing said scatter signal array and said transmission signal array;
  f) a processor for processing said transmission signal array to associate with each said pixel a value of effective atomic number $Z_{eff}$ determined in accordance with a preselected mapping that uniquely specifies said $Z_{eff}$ value for values of said counting-mode pixel and integrating-mode pixel; and
  g) a display for displaying a scatter image comprising scatter display pixels corresponding to said scatter pixels and a transmission image comprising transmission display pixels corresponding to said transmission pixels, and wherein:

at least one of said scatter image and said transmission image is colorized, each pixel of said colorized image being displayed in accordance with a color descriptor derived from said $Z_{eff}$ value corresponding to said pixel.

30. A scanning X-ray inspection system for scanning an object and displaying pixelated images of its contents, comprising:
   a) an X-ray generation device for generating a flying-spot pencil beam of X-rays repetitively sweeping along a straight line in a scanning direction across said object;
   b) transport means for moving said object through an inspection zone of said system in a transport direction substantially perpendicular said scanning direction;
   c) a forward scatter detector for generating a scatter signal represented by a forward scatter signal array comprising forward scatter pixels, each representative of the intensity of X-rays forward scattered from a particular region of said object;
   d) a backscatter detector for generating a scatter signal represented by a backscatter signal array comprising backscatter pixels, each corresponding to one of said forward scatter pixels and representative of the intensity of X-rays in said pencil beam backscattered from said particular region of said object;
   e) a transmission detector for generating a transmission signal represented by a transmission signal array comprising transmission pixels, each corresponding to one of said forward scatter pixels and representative of the intensity of X-rays in said pencil beam transmitted said particular region of said object and undeviated in direction
   f) a read-write memory for storing said forward scatter signal array, said backscatter signal array, and said transmission signal array;
   g) a processor for processing said forward scatter, backscatter, and transmission signal arrays to associate with each said pixel a value of $Z_{eff}$; and
   h) a display for displaying a forward scatter image comprising forward scatter display pixels corresponding to said forward scatter pixels, a backscatter image comprising backscatter display pixels corresponding to said backscatter pixels, and a transmission image comprising transmission display pixels corresponding to said transmission pixels, and wherein:
      at least one of said forward scatter image, said backscatter image, and said transmission image is colorized, each pixel of said colorized image being displayed in accordance with a color descriptor derived from said $Z_{eff}$ value corresponding to said pixel, and
      each said $Z_{eff}$ value is determined in accordance with a predetermined mapping that uniquely specifies said $Z_{eff}$ value with values of said forward scatter pixel, said backscatter pixel, and said transmission pixel.

31. A method for X-ray inspection of an object using transmitted and Compton scattered radiation, comprising the steps of:
   a) generating a pencil beam of X-rays that oscillates repetitively along a straight line in a scanning direction within an inspection zone;
   b) transporting said object through said inspection zone in a transport direction substantially perpendicular said scanning direction;
   c) scanning said object with said pencil beam of X-rays;
   d) detecting X-rays scattered from said object using said a scatter detector and storing a scatter signal array comprising scatter pixels, each representative of the intensity of X-rays scattered from a particular region of said object;
   e) detecting X-ray transmission through said object using a transmission detector and storing a transmission signal array comprising transmission pixels, each corresponding to one of said scatter pixels and representative of the intensity of X-rays in said pencil beam transmitted through said particular region of said object and undeviated in direction;
   f) processing said scatter and transmission signal arrays to associate with each said pixel a value of effective atomic number $Z_{eff}$, wherein each said $Z_{eff}$ value is determined in accordance with a preselected mapping that uniquely specifies said $Z_{eff}$ value for values of said scatter pixel and said transmission pixel; and
   g) displaying a scatter image comprising scatter display pixels corresponding to said scatter pixels and a transmission image comprising transmission display pixels corresponding to said transmission pixels, wherein at least one of said scatter image and said transmission image is colorized, each pixel of said colorized image being displayed in accordance with a color descriptor derived from said $Z_{eff}$ value corresponding to said pixel.

32. A method as recited by claim 31, wherein at least one of said transmission and scatter images is produced using signals acquired using a photon counting mode and an integrating mode simultaneously and a combination signal is formed by soft switching between said photon counting mode and said integrating mode.

\* \* \* \* \*